United States Patent [19]
Scraggs et al.

[11] Patent Number: 5,496,469
[45] Date of Patent: Mar. 5, 1996

[54] APPARATUS FOR REDUCING AND SEPARATING EMULSIONS AND HOMGENEOUS COMPONENTS FROM CONTAMINATED WATER

[76] Inventors: Charles R. Scraggs, 1000 Abingdon La., Alpharetta, Ga. 30202; Jack R. Creel, 10803 Tupper Lake; Alonzo L. DeCell, 10030 Cedar Creek, both of Houston, Tex. 77042

[21] Appl. No.: 364,696

[22] Filed: Dec. 28, 1994

Related U.S. Application Data

[62] Division of Ser. No. 94,684, Jul. 20, 1993, Pat. No. 5,411,665.

[51] Int. Cl.[6] ............................ C02F 1/40; B01D 17/022
[52] U.S. Cl. .................. 210/177; 210/202; 210/257.1; 210/299; 210/320; 210/532.1
[58] Field of Search ...................... 210/610, 611, 210/620, 631, 708, 799, 802, DIG. 5, 177, 181, 182, 184, 186, 187, 202, 205, 257.1, 261, 299, 300, 301, 320, 521, 522, 532.1, 540

[56] References Cited

U.S. PATENT DOCUMENTS

| | | | |
|---|---|---|---|
| 3,856,667 | 12/1974 | Azarowicz | 210/611 |
| 3,965,004 | 6/1976 | Garber | 210/DIG. 5 |
| 4,364,833 | 12/1982 | Loegering | 210/521 |
| 4,374,029 | 2/1983 | Jaisinghani | 210/799 |
| 4,432,887 | 2/1984 | Zajic et al. | 210/611 |
| 4,722,800 | 2/1988 | Aymong | 210/802 |
| 4,897,206 | 1/1990 | Castelli | 210/799 |
| 5,032,273 | 7/1991 | Senyard, Sr. et al. | 210/521 |
| 5,093,006 | 3/1992 | Kalnins | 210/182 |
| 5,242,604 | 9/1993 | Young et al. | 210/802 |
| 5,439,597 | 8/1995 | Allen | 210/257.1 |

Primary Examiner—Thomas Wyse
Attorney, Agent, or Firm—Jones & Askew

[57] ABSTRACT

A system for the reduction and separation of highly emulsified and/or immiscible components mixed in a fluid, particularly useful for treating waste water contaminated with oils and oily emulsions, as from depleted oil wells, vehicle washing stations, and meat rendering plants. The system is operative for reducing the amount of organic and inorganic contaminants, and is particularly suitable for reducing the amount of oil, with oil-consuming microorganisms, and separating oil that is not consumed within the system from the water so that the oil may be recycled and the water discharged into wetlands or sanitary sewers without further treatment. The system comprises a multi-stage, recirculating series of treatment tanks. In a first stage, the fluid is recirculated through a treatment loop where the fluid is aerated and then passed through a coalescer. Organic metabolizing microorganisms that contribute to de-emulsification and contaminant reduction within the system are introduced, together with a superoxygenated catalyst containing microorganism nutrients. The coalescer is preferably a horizontal stack of evenly spaced apart polypropylene plates with sinusoidal corrugations running along the plane of the plates. In subsequent treatment stages, the fluid is recirculated through filters prior to discharge from the system.

52 Claims, 22 Drawing Sheets

APPARATUS FOR REDUCING AND SEPARATING EMULSIONS AND HOMGENEOUS COMPONENTS FROM CONTAMINATED WATER

This is a division of application Ser. No. 08/094,684 filed Jul. 20, 1993, now U.S. Pat. No. 5,411,665.

TECHNICAL FIELD

The present invention relates generally to a system for the separation highly emulsified or homogeneous components mixed in a fluid. More specifically, the present invention relates to a system for reducing and separating oil from oil-contaminated water or oily emulsions such that the water may be reused or discharged, particularly useful for the reduction of industrial organic wastes.

BACKGROUND OF THE INVENTION

The protection of the environment is now a matter of great concern. Also, the recovery and reuse of industrial resources has become a matter of vital economic interest for many industries. As a result, the disposal or reuse of industrial effluent, machine tool coolant, oily water mixtures, and industrial organic wastes has become important to many industries in the United States and internationally.

More specifically, the contamination of water and other fluids by grease, fuel, oil, and other contaminants poses a significant environmental and economic problem in the United States and elsewhere. Across the United States, there are innumerable establishments such as car and truck washes motor vehicle service stations, motor vehicle and machine repair shops, construction equipment cleaning shops, machine tool cleaning shops, meat rendering plants, restaurants, and many other types of establishments that generate contaminated water as a result of their cleaning processes. Also, rainwater runoff from highways and parking lots, crude oil tank farms, petrochemical facilities, and clean up on off-shore oil platforms are additional sources of contaminated water.

Further still, it is known that many substantially depleted oil wells contain significant quantities of oil mixed in with ground water. Presently, some of the useful oil is separated from the ground water by use of retention ponds and skimming the oil, but some of the oil remains in the water, often in emulsified form. The water generally cannot be released into the surface environment because of such residual oil content, and is pumped back into the well or kept in the retention ponds for long periods of time. If more efficient methods were available for separating the oil from the water, the water could more quickly and readily be discharged into the environment, for example to replenish wetlands often found in coastal oil producing areas.

The contamination of ground water, water supplies, sewage systems, and street drainage systems due to the discharge of such contaminated waters is a concern of the United States Environmental Protection Agency, and state and local environmental agencies. Therefore, the removal of immiscible and emulsified components, and other contaminants which are mixed with water, is preferable for the safe and legal disposal or reuse of such contaminated water.

A variety of methods and apparatus are known in the art for separating immiscible components and removing other contaminants from fluids. For example, one apparatus which is used for separating immiscible oily components mixed in a fluid is the Quantek CPS fluid treatment apparatus. This apparatus utilizes a coalescer plate system, and is manufactured by Quantek, Inc., of Tulsa, Okla. The Quantek apparatus is used for the treatment of oil-contaminated waste water, and it comprises the system of passing water through a stack of closely spaced, corrugated, polypropylene plates, after which the water flows past an oil dam, and exits the apparatus.

Although the Quantek apparatus can reduce the level of immiscible oil in water, it has many drawbacks. First, and most importantly, the apparatus is not effective in breaking up emulsions. Second, the level of fluid purity that may be achieved by this apparatus is limited. The range of contaminants that may be removed by the Quantek apparatus is limited to those components which are removed solely by gravimetric separation and oleophilic attraction in the coalescer. The apparatus does not remove other water soluble organic contaminants as effectively as is desired, or reduce the turbidity of the water. Finally, the Quantek apparatus is costly to maintain as it must be shut down periodically for the removal of accumulated contaminants within the system.

An example of a waste fluid treatment apparatus that is capable of breaking up emulsions is the liquid separating and recycling apparatus described in U.S. Pat. No. 4,361, 488. This liquid separating and recycling apparatus removes solid contaminants from tramp oil which contains aqueous emulsions. Once the emulsions are separated, the remaining aqueous liquid is continually recirculated through the treatment loop which contains a filter followed by a coalescer. The filter removes dirt, grit, and other solid contaminants from the oil-contaminated water before the water enters the coalescer. The coalescer comprises one or more fibrous filter bed coalescer units which preferably are upright spools wound with strands of yarn or synthetic fiber.

Although the liquid separating and recycling apparatus is capable of breaking up emulsions, this system is limited in that it is more costly to maintain. First, it must be shut down periodically for the removal of accumulated contaminants within the system. Further, the filter being positioned prior to the coalescer in the recirculating treatment loop greatly reduces the useful life of the filter as higher levels of contaminants enter the filter. Therefore, the system must also be shut down for the cleaning or replacement of the filter.

An example of a more recent innovative water treatment system is a water bioremediation apparatus which is manufactured by Biotek Environmental Services, Inc. of Houston, Tex., under the mark "Waste Buster." The Biotek apparatus is used for continuous or batch treatment of oily waste water. The Biotek system comprises a large treatment tank, a means for introducing oil metabolizing microorganisms and catalysts, a vertically-flowing honeycomb configured oleophilic coalescer, pumps for recirculating the waste/microorganism mixture through the coalescer, and an output filter. The Biotek system is less expensive to maintain as the microorganisms metabolize oil and other contaminants within the apparatus, thus reducing the rate of accumulation of contaminants within the apparatus. Since the microorganisms effectively "clean" certain contaminants from the system, the frequency of shut-downs for the removal of the accumulated contaminants is reduced.

Although the Biotek apparatus is less costly to maintain, the level of fluid purity that may be achieved by this apparatus is limited. The range of contaminants that are removed by the Biotek apparatus is limited in that it employs only one filter. Because of its lack of an absorption filter it cannot handle most organic chemical emulsions. The coalescer used in the Biotek apparatus, which is a vertical flow type coalescer, is limited in flow capacity and efficiency. The degree and efficiency of aeration is also limiting factor in the speed of the biodegradation. Further, the Biotek apparatus is limited in that generally the fluid must be treated in a batch process mode unless the fluid is not highly contaminated. Therefore, the method of treatment used in the Biotek apparatus is directed by the level of contamination of the fluid, and not by the user's fluid supply volume needs.

An example of an oil decontamination and water recycling system that is operable in a continuous mode for the treatment of highly contaminated water is the single pass treatment system described in U.S. Pat. No. 5,011,609. In this single pass treatment system, the fluid flows through several different coalescer compartments that are sequentially positioned, and then the fluid flows through an oil filter, a coalescing centrifugal separator, and a water polish filter.

Although this single pass treatment system may be used to treat a continuous supply of highly contaminated water, this single pass treatment system is limited in that it also is cumbersome and costly to produce, operate, and maintain. This system is more costly and cumbersome as it employs several different types of coalescers and filters, some of which may require frequent cleaning or replacement. Further, the single pass treatment system is limited in that it is operable only in a continuous treatment mode. Therefore, the single pass treatment system cannot be utilized by industries which require batch fluid treatment because of the source of their contaminated fluid.

Although there are a variety of systems known in the art for removing immiscible components and other contaminants from fluids, as demonstrated above, these known systems all have limitations and drawbacks, and therefore they do not meet the current environmental or economic needs of various industries. Therefore, what is needed is a high efficiency waste fluid treatment system for the treatment of waste fluids that contain emulsions. Further, this system needs to be rapid, easy and inexpensive to operate and maintain, flexible in order to meet a user's changing needs for either batch or continuous fluid treatment, and easy to switch between its batch and continuous fluid treatment modes. Moreover, it is believed that a treatment process involving multiple passes through a coalester may enhance gravimetric separation and efficiency and extends the useful life of filters and absorbers (such as activated carbon), thereby reducing maintenance and replacement costs.

SUMMARY OF THE INVENTION

The present invention addresses an existing need in the prior art by providing a high efficiency waste fluid treatment system for the treatment of waste fluids which contain oils, and particularly oily emulsions and a wide range of organic and inorganic contaminents. Further, this system is rapid, easy and inexpensive to operate and maintain, flexible in order to meet a user's changing needs for either batch or continuous fluid treatment, and is quick and easy to switch between its batch and continuous fluid treatment modes.

Waste streams containing a wide spectrum of organic wastes conducive to bio-degradation are effectively reduced to clean or reusable water in this invention. Such a spectrum includes hundreds of chemicals and compounds that cause elevated levels of biological and chemical oxygen demands in the waste stream. Many inorganic contaminants are also removed as a by-product of the process. Industries finding use for the invention include, in addition to those producing organic emulsified waste streams, metals manufacturing, dry cleaning, textiles, paper and paper products, lumber and wood products industries.

Briefly described according to one aspect of the invention, a method of separating immiscible components mixed in a fluid comprises the steps of (a) providing a coalescer comprising a plurality of spaced apart oleophilic plates, each plate having corrugations running along the plate forming crests and valleys, the crests and valleys including bleed holes for passage of the immiscible components, (b) adding oil metabolizing microorganisms to the fluid and (c) passing the fluid through the coalescer. Further, a microorganism catalyst can be added to the fluid to increase the rate of digestion and de-emulsification by the microbes. Further still, the fluid is aerated.

Preferably, the fluid is filtered after the fluid has passed through the coalescer, prior to discharge. More preferably still, the fluid is recirculated through the filtering stage before discharge, for additional filtering. Also, the fluid is preferably recirculated through the coalescer prior to transferring the treated fluid to the filtering stage.

More particularly described, untreated fluid is introduced into a first treatment tank or reactor, accumulated in the reactor tank, and thereafter transferred into the coalescer. Microorganisms and catalyst are introduced in a region of this reactor, prior to the coalescing stage. The preferred coalescer is mounted above the first treatment tank, and the outflow of the coalescer is directed back into the reactor tank for recirculation and further waste reduction.

Fluid is accumulated in the first treatment tank or reactor from introduction of new fluid for treatment and from outflow from the coalescer. When the level of fluid in the first treatment tank reaches a predetermined level, fluid that has been separated from immiscible components is transferred into a second treatment tank. Separated fluid is accumulated in the second treatment tank.

When the level of fluid in the second treatment tank reaches a second predetermined level, the fluid is transferred to a third treatment tank. Preferably, the fluid is filtered as it is transferred from the second treatment tank to the third treatment tank.

In the third treatment tank, fluid is accumulated. When the level of fluid in the third treatment tanks reaches a third predetermined level, the fluid is recirculated back into the second treatment tank, for additional filtering and refiltering.

Fluid accumulates in both the third treatment tank and the second treatment tank. When the level of fluid in both the second treatment tank and the third treatment tank reaches a fourth predetermined level, the fluid is transferred to a fourth treatment tank.

Fluid accumulates in the fourth treatment tank. When the level of fluid in the fourth treatment tank reaches a fifth predetermined level, treated fluid is discharged from the fourth treatment tank. Preferably, the method includes the step of filtering the treated fluid as it is discharged from the fourth treatment tank.

According to another aspect of the invention, a method of separating immiscible components mixed in a fluid comprises the steps of (a) aerating the fluid; (b) adding oil metabolizing microorganisms to the fluid; (c) providing a coalescer which comprises a plurality of horizontal, spaced apart plates, each plate having corrugations running along the plate forming crests and valleys, the crests and valleys including bleed holes for passage of the immiscible components; (d) passing the fluid at least once through the coalescer; and (e) subsequently filtering the fluid through a filtration media.

According to yet another aspect of the invention, a method of separating immiscible components mixed in a fluid, which comprises the steps of (a) introducing fluid to be cleaned into a first treatment tank; (b) providing a coalescer; (c) prior to any filtration, moving the fluid from the first treatment tank through the coalescer; (d) removing cleaned fluid from the coalescer; (e) filtering the cleaned fluid removed from the coalescer; and f) recirculating the cleaned fluid through a prior treatment stage. In this aspect of the invention, the cleaned fluid may be recirculated through the coalescer, or through the filter, or through both. In preferred embodiments of the invention, recirculation occurs at both the coalescer stage and the filtering stage, for maximization of removal of immiscible components.

Still more particularly described, a method of separating immiscible components mixed in a fluid comprises the steps of (a) introducing uncleaned fluid into a first treatment tank; (b) aerating the fluid; (c) adding oil metabolizing microorganisms to the fluid; (d) providing a coalescer, (e) passing the fluid through the coalescer at least once; (f) removing partially cleaned fluid from the coalescer into a second treatment tank; (g) accumulating partially cleaned fluid in the second treatment tank; (h) removing fluid from the second treatment tank; (i) filtering the fluid; and (j) discharging the filtered fluid.

Still more particularly described, the present invention also provides an apparatus for separating immiscible components mixed in a fluid that includes a first treatment tank suitable for growing oil metabolizing microorganisms, which includes an inlet, an aerator, a weir, and an outlet such that when the fluid reaches the level of the lower edge of the outlet, the fluid discharges from the treatment tank by gravity.

The apparatus also includes a coalescer channel that includes an inlet, a coalescer, a dam, and an outlet. The coalescer is positioned in the coalescer channel between the inlet and the outlet, and the dam is positioned between the coalescer and the outlet. The dam has an end position spaced-apart from the bottom of the coalescer channel so as to allow fluid to flow under the dam such that lower weight components located in higher levels of the fluid in the coalescer channel are blocked by the dam. The coalescer channel is preferably positioned horizontally above the first treatment tank and is operative to discharge fluid back into the first treatment tank or reactor for recirculation and further digestion.

The apparatus also includes a first pump for introducing uncleaned fluid into the first treatment tank, and a second pump for transferring fluid from the first treatment tank to the coalescer channel.

The apparatus also includes a second treatment tank which is positioned to receive relatively clean fluid discharged from the first treatment tank. The apparatus also includes a third treatment tank positioned to receive relatively clean fluid discharged from the second treatment tank. A third pump is provided for transferring fluid from the second treatment tank to the third treatment tank. A first filter is positioned subsequent to the third pump, and prior to the third treatment tank, for filtering the fluid prior to discharging the fluid into the third treatment tank.

A first barrier is located between the second treatment tank and the third treatment tank, such that when the level of fluid in the third treatment tank rises to the level of the first barrier, the fluid passes over the first barrier back into the second treatment tank for recirculation through the first filter.

The apparatus also includes a fourth treatment tank positioned to receive relatively clean fluid that has been discharged from the third treatment tank. A second barrier is located between the third treatment tank and the fourth treatment tank, wherein the second barrier is higher than the first barrier, and such that when the fluid in the third treatment tank exceeds the level of the top of the second barrier, the relatively clean fluid passes over the second barrier into the fourth treatment tank.

Subsequent to the fourth treatment tank is a fourth pump which withdraws fluid from the fourth treatment tank, and pumps the fluid through a second filter. After the fluid passes through the second filter, the fluid is discharged from the system.

The system of the present invention reduces the levels of several contaminants in fluids to levels acceptable to Environmental Protection Agency standards. The contaminants include, but are not limited to, organic wastes such as oils, fuels, and an all inclusive spectrum of hydrocarbons, as well as inorganic wastes including heavy metals. Further, the system of the present invention greatly reduces the turbidity of the treated fluid. The invention reduces levels of biological oxygen demand (BOD), chemical oxygen demand (COD), and suspended solids to levels acceptable to discharge to sewer or the environment. Also reduced are phosphates and total nitrogen.

Therefore, it is an object of the present invention to provide a high efficiency waste fluid treatment system for the treatment of waste fluids that contain oily emulsions.

It is a further object of the present invention to provide a waste water treatment system that is rapid, yet easy and inexpensive to operate and maintain.

It is a further object of the present invention to provide a waste water treatment system that is operative to de-emulsify oily waste emulsions with oil metabolizing microorganisms that separate oily emulsions into larger oil droplets and globules, and also reduce the amount of oil by consuming the oil.

It is another object of the present invention to provide a compatible operating environment for oil consuming microorganisms for waste water treatment.

It is another object of the present invention to provide a system for waste water treatment involving the use of microorganisms utilized for digestion of organics other than oily waste or hydrocarbons, or for separating or reducing biological and chemical oxygen demand and other contaminants such as heavy metals.

It is a further object of the present invention to provide a system that is selectably operable in either a batch or a continuous fluid treatment mode.

It is another object of the present invention to provide a water treatment system that may be quickly and easily switched from a continuous fluid treatment mode to a batch fluid treatment mode, and vice versa.

These and other objects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 6A–6I illustrate the apparatus for separating immiscible components mixed in water in various stages of the batch mode of operation of the preferred embodiment as shown in FIG. 1.

DETAILED DESCRIPTION OF THE PREFERRED EMBODIMENTS

Figure 1:
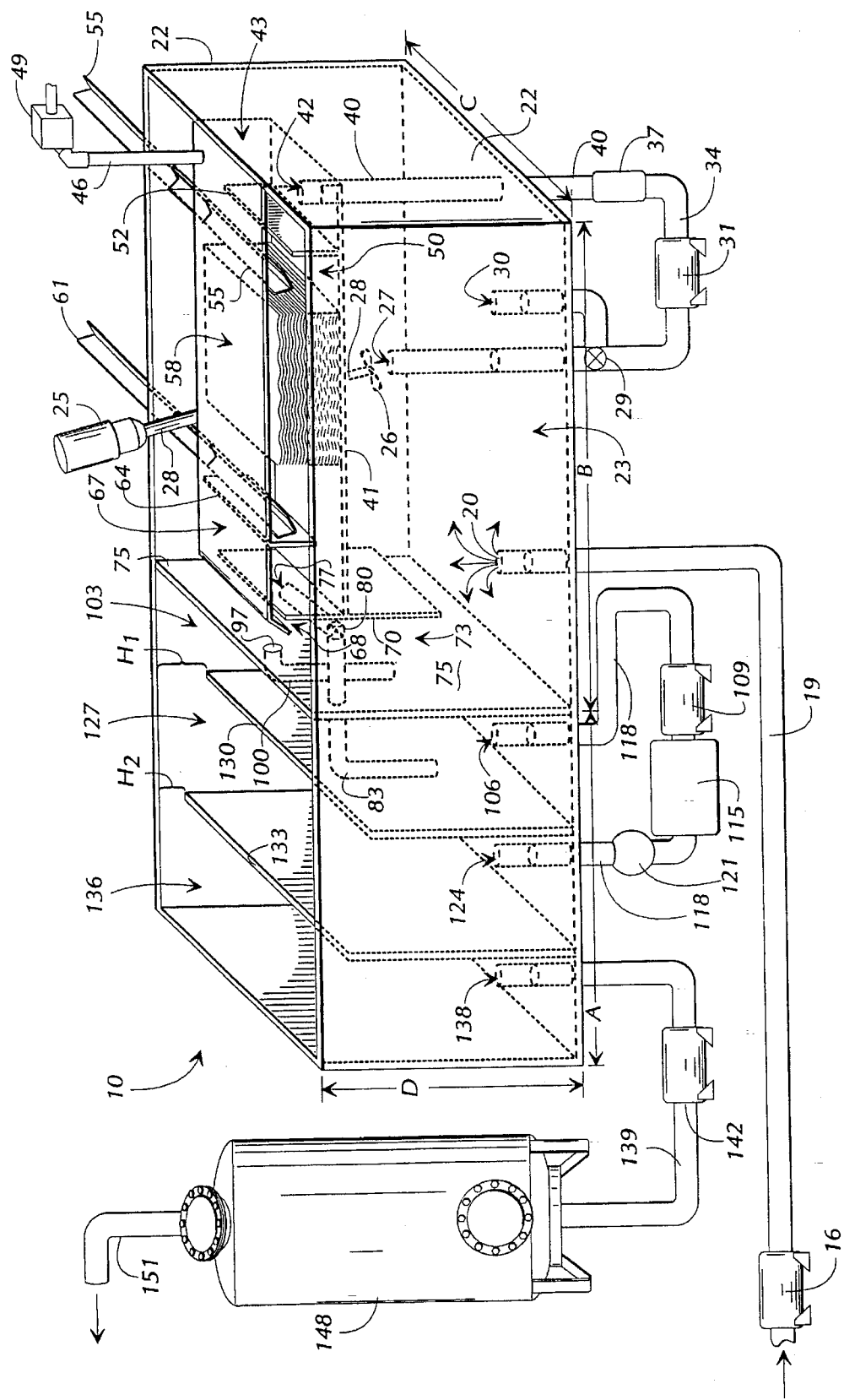
FIG. 1 is a pictorial view of a system for carrying out methods of separating immiscible components mixed in water according to the preferred embodiment of the present invention.

Referring now to the drawings, in which like numerals indicate like elements throughout the several views, FIG. 1 shows a pictorial view of an apparatus or system 10 for separating immiscible components mixed in water, constructed in accordance with the preferred embodiment of the present invention. In the invention, contaminated water is aerated, bioremediated, passed repeatedly through a coalescer, and then filtered in a recycling filtration stage. The disclosed system is selectably operable in a batch mode or in a continuous mode of operation, depending upon settings of various valves and pumps. Operation in the continuous mode will be described first. It should be understood from that outset that, although the preferred embodiment is described in connection with the treatment of oil-contaminated water, and particularly oily emulsions, the present invention is operative for treatment of water that may be contaminated with other types of immiscible and highly emulsified components.

Continuous Mode Embodiment

First Treatment Tank

The preferred system 10 comprises a series of fluid-holding tanks, starting with a first tank or reactor 22, into which fluid to be treated is introduced, processed, and passed to a subsequent stage of treatment. The first tank 22 is considered a "reactor" tank or "recirculating" tank, as it is utilized for reaction of microorganisms with contaminants in the water, and the water is preferably recirculated through the first tank until it is clean enough to discharge to subsequent stages of treatment.

Immiscible or emulsified components mixed in water are introduced into the first tank 22 as influent by a first pump 16, preferably with a controllable flow rate $F_1$, which transfers the contaminated water via pipe 19, through a first treatment tank inlet 20, into the first treatment tank 22. The first treatment tank 22 is generally closed on all sides, with the exception that the upper end or top 24 is open, for mounting other components of the system as will be described. For a 1000 gallon system, the tank is preferably a generally rectangular, trough-like enclosure with an open top, approximately 10 feet long, 4 ½ feet wide, and 5 ½ feet deep, fabricated from welded sheets of sheet metal, and holds about 1000 gallons of water.

The first tank 22 (and for that matter, all of the treatment tanks described herein) preferably is formed by welding sheet metal panels to a tubular metal frame (not shown) including a tubular metal base, for support and strength. If needed, the panels may be further reinforced by welding additional tubular metal members.

The first treatment tank 22 includes an aeration region 23, wherein the contaminated water accumulates and is aerated by a mechanical aerator 25. The mechanical aerator 25 is a conventional electric motor driven aerator having a propeller 26 mounted at one end extending into the tank. The aerator is preferably mounted on the top of first treatment tank 22 in a position with its propeller extending downwardly into the tank approximately one-half to two-thirds of the way to the bottom, so that the propeller can agitate and aerate the material in the tank. The aerator 25 further preferably includes a means for introducing air into aeration region 23, for example, an air jet or passageway 28 positioned to eject air at the distal end of the aerator. In the preferred embodiment, a vortex is created by the propeller that creates a negative pressure through the hollow shaft of the aerator. Air is pulled down the shaft and efficiently mixed in the circulation caused by the aerator.

Within the tank 22, a first pump intake 27 is positioned to withdraw fluid from a central region of the tank at a predetermined level, for movement of the fluid to a coalescer. Once the fluid level reaches a depth within the aeration region 23 that is level with the top of first pump intake 27, the aerated water is withdrawn from the uppermost regions of aeration region 23, through first pump intake 27, and passes through a batch/continuous selection valve 29. The selection valve 29 allows fluid to be drawn from the first pump intake 27 for operation in the continuous mode, or from a second, lower pump intake 30 for operation in the batch mode. The second pump intake is preferably positioned in the first treatment tank 22 at the bottom of the tank, which allows complete removal and drainage of the tank.

In the preferred embodiment, the first pump intake 27 includes an intake screen (not illustrated) and extends vertically approximately 36 inches from the bottom of first treatment tank 22 such that when the volume of water in first treatment tank 22 reaches approximately 1,000 gallons, the water then flows into the first pump intake 27. The aerated water is then pumped through a second pump 31, through pipe 34, through a fluid heater 37, through pipe 40, and is then discharged into a coalescer channel 41, which contains a coalescer 58. The second pump 31 preferably has a controllable flow rate $F_2$, generally higher than $F_1$ so that recirculation in the tank 22 is promoted.

The fluid heater 37 is preferably located external to the reactor tank. Alternatively, immersion heating elements could be located in the reactor tank. The preferred fluid heater 37 is a conventional electrical/or fuel heater such as a model 3100, 300,000 BTU/hr, manufactured by Transchem Industries Inc., located in Atlanta, Ga. The heater is preferably operated in a manner to heat the water to between approximately 40° and 100° F. More preferably, fluid heater 37 is operated in a manner to heat the water to between approximately 80° and 100° F. Fluid heater 37 operates to increase the activity of oil metabolizing microorganisms, if present, and also operates to increase the efficiency of the coalescer 58 due to the fundamentals of Stokes equation.

Still referring to FIG. 1, the coalescer channel 41 is horizontally located above first treatment tank 22, and comprises a microorganism introduction region 43, a first dam 52, a first skimmer 55, a coalescer 58, a second skimmer 61, a second dam 64, and finally an outlet 68. The coalescer channel 41 is preferably positioned within the interior upper open end of the first tank 22 to conserve space and simplify fabrication of the system, since discharge from the coalescer is re-introduced back into the tank for recirculation. The coalescer channel is preferably a generally rectangular, trough-like enclosure with an open top, approximately 9 feet long, 24 inches wide, and 22 inches deep, fabricated from welded sheets of sheet metal.

Microorganism and Catalyst Introduction

When the aerated water leaves pipe 40, the water passes through coalescer channel inlet 42, and is discharged into a microorganism introduction region 43. In the disclosed embodiment, oil metabolizing microorganisms are introduced into microorganism introduction region 43 via bioreactant injector 49, through a bioreactant influent inlet 46. Alternatively, the oil metabolizing microorganisms may be manually introduced into the first treatment tank 22 or directly into coalescer channel 41. The oil metabolizing microorganisms function to reduce the levels of oil and other organic contaminants in the water by actually consuming the oil, and also to aid in breaking up oil and water emulsions, thereby enhancing the action of subsequent coalescer stages. The microorganisms are believed to remain active during the entire process up until the point of discharge, and thereby contribute to cleanliness of subsequent filtration stages. It is believed that the microorganisms contribute to lengthening the effective life of carbon and other filters, by consuming contaminants that would otherwise accumulate in the filters, pumps, pipes, surfaces of the apparatus, etc.

Accordingly, the use of oil metabolizing microorganisms reduces the accumulation of contaminants in apparatus 10, and therefore greatly reduces the need to shut down and clean the system.

It will be understood that any microorganism which is capable of facilitating the break up of emulsions, or bioremediating fluid containing immiscible components may be used in the present invention. More specifically, the preferred microorganisms used in the present invention are capable of reducing fluid levels of oils and organics including, but not limited to benzene, toluene, ethylbenzene, and xylene. Most preferably, the microorganisms are a mixture of naturally occurring oil metabolizing microorganisms that have been selected for their activity by Alpha Environmental, Inc., of Austin Tex., and are commercially available in powder form under the trademarks BIOSEA, MICROX, and PETROLOGIC. Such preferred oil metabolizing microorganisms are hereinafter referred to as "Alpha" microorganisms.

The preferred Alpha microorganisms are a mixture of dried natural nonhazardous, nontoxic, salt tolerant soil and marine microorganisms in combination with inert clay or commercial vegetable extract, available in powdered form. Further information about the preferred Alpha microorganisms is available in the literature supplied by the manufacturer.

It will be understood that Alpha microorganisms are preferred for use in the present invention but not required for practicing this invention. Other types of oil metabolizing or emulsion reducing microorganisms, for example, naturally occurring organisms present in the waste water, should also be suitable for use in the present invention, so long as such microorganisms promote the reduction of oil concentration and/or breakup of oily emulsions. Other types of microorganisms that demonstrate a propensity for waste consumption, reduction, or other desirable reaction should also be suitable for use in the invention.

It will further be understood that a particular objective of the present invention is to provide an environment wherein such oil metabolizing or other types of microorganisms thrive and reproduce, so that their known propensity for oil consumption and/or emulsion breakup can be maximized and utilized. Accordingly, it will be appreciated that temperature control and aeration are significant considerations as to the provision and maintenance of such an environment.

In another embodiment of this invention, a catalyst is used to enhance the activity of the Alpha or other microorganisms. Most preferably, a proprietary microorganism catalytic agent sold under the trademark BIO-CATALYST, which is commercially available from Alpha Environmental, Inc., is used in combination with the Alpha microorganisms to promote and accelerate the growth and reproduction of the Alpha microorganisms. The preferred Alpha BIO-CATALYST is an aqueous solution of various natural extracts and micronutrients that is biodegradable and nonhazardous. It is believed to be predominantly superoxygenated water and organic nutrients, vitamins, and minerals, likely obtained by partially fermenting a naturally-occurring moss material. It is believed that the catalyst provides phosphorus, sulfur, potassium, magnesium, calcium, sodium, iron, and various trace elements such as zinc, copper, and manganese, to facilitate growth and reproduction of the microorganisms.

It is believed that the preferred catalyst delivers oxygen at the cellular level to the preferred Alpha microorganisms, as well as nutrients for the microorganisms. The catalyst, if used, may be added to the apparatus in combination with the microorganisms, or it may be added separately.

It is also noted that the preferred ALPHA BIO-CATALYST appears to causes aerobic microbes to function in anaerobic conditions (i.e. the bottom of tanks and the interior of filter vessels) which do not have direct air/water interface activity. This adds efficiency to the overall digestion of contaminents within the system.

The amounts of microorganisms and catalyst to be used in the present invention vary according to the volume of water, the contamination level of the water, the conditions of the apparatus, and the type of contaminants in the water. Generally, it is believed that the preferred catalyst should be added with the microorganisms in proportions between about 1000:1 and 250:1 per unit volume, for example, 10 gallons of catalyst to each one pound of powdered microbes represents an inoculation rate suitable to treat a 15 gpm waste stream. These constituents are preferably replenished at the rate of one to two pounds of microbes per month and treatment with 10 gallons of catalyst weekly. Conditions of the waste stream might dictate addition of more or less microbes and catalyst.

The following are particular examples of treatment regimens including the amounts of microorganisms and catalyst for particular types of waste water.

EXAMPLE 1

A waste water stream derived from a washing operation for a tank truck cleaning facility exhibited the following typical characteristics with highly emulsified oils and greases due to detergents used in the washing operations:

| | |
|---|---|
| BOD | 3250 mg/L |
| oils/greases (O & G) | 2056 mg/L |
| total suspended solids (TSS) | 555 mg/L |

| | |
|---|---|
| BOD | 3250 mg/L |
| flow (gpm) | 15 gpm |

The reaction process and start-up was initiated by filling the reactor 22 only with the effluent waste stream and recirculating through the coalescer with aeration for approximately two (2) hours prior to receiving effluent into the unit on a persistent 15 gpm basis. The following test examples illustrate the enhanced results obtained in utilizing the disclosed biological process with the disclosed recirculating aspects of the system.

Test #1

Alpha microorganisms were introduced at the rate of 400–500 grams (dry powdered form) initially into the reactor and replenished monthly at the same rate. Nutrients (nitrogen, phosphorus, etc.) and/or catalyst recommended by the supplier of the microbes were introduced at the rate of five (5) gallons daily. The waste stream was monitored daily with the following results:

| | 24 Hours | 48 Hours | 72 Hours | 96 Hours |
|---|---|---|---|---|
| BOD | 1057 | 646 | 200 | 92 |
| O & G | 581 | 121 | 21 | 5 |
| TSS | 222 | 100 | 27 | 10 |
| pH | 5.6 | 6.5 | 7.0 | 7.1 |

Results were monitored after the carbon filter and after the four (4) day period remained asymptotic generally to the 96 hour levels. Clarity of the process water was excellent; odors and septic conditions were now existent or always minimal. No backwashing was required during test period.

Test #2

Microorganisms were introduced at the same rate and schedule as Test #1. No nutrients or catalysts were used. Results were as follows:

| | 24 Hours | 48 Hours | 72 Hours | 96 Hours |
|---|---|---|---|---|
| BOD | 2320 | 1860 | 1620 | 1540 |
| O & G | 1920 | 1500 | 870 | 626 |
| SS | 410 | 460 | 357 | 320 |
| pH | 5.8 | 6.5 | 6.4 | 6.6 |

Results remained consistent after 72–96 hour period. High filter pressures were noted on the media filter and carbon. Frequent backwashing was required. Clarity was not good and septic conditions existed as evidenced by odors in the processed stream.

Test #3

No external microorganisms or biological additives were introduced into the system. Because of extremely heavy loadings of emulsified oil/grease, filter plugging was noted before the end of 24 hours. Fouling of the carbon filter was evident. No test data was collected since operation at 15 gpm was too rapid to break the emulsion and provide any measurable de-emulsification through the coalescer and downstream filter units.

The test conclusions were as follows:

1. Addition of a microbe culture suitable for the waste stream enhances the breaking of emulsions in the waste stream to allow maximum efficiency of the oil/water coalescing, separation and filtering capability.
2. The use of catalyzed processes or oxygen enhancement at the cellular level appear to facilitate aerobic activity in anaerobic conditions, creating fast, complete reduction of contaminants, even more than with microorganisms alone.
3. Without enhanced biological activity, the system flow rates must be slowed to 20% or 30% of enhanced performance, or filter plugging and fouling will rapidly make the unit inefficient or inoperative.

As can be seen from the foregoing examples, the efficacy and efficiency of the present invention is improved with utilization of both Alpha microorganisms and catalyst.

Coalescer

Still referring to FIG. 1, once the water in microorganism introduction region 43 of the coalescer channel 41 reaches the level of the top of a first dam 52, the water passes over the first dam into a coalescer influent chamber 50, and then it passes through the coalescer 58. The first dam 52 is preferably a planar metal sheet about 11 inches in height positioned within the coalescer channel 41 prior to the coalescer 58. When the water in the microorganism region 43 reaches the height of the first dam, it flows over the dam and into the coalescer, where it continues to accumulate.

Located in the uppermost regions of coalescer channel 41 are two skimmers, 55 and 61. A first skimmer 55 is positioned between first dam 52 and coalescer 58 at a centerline depth equal to the weir height at the end of the flow channel, and operates to remove immiscible components which rise to the upper levels of the fluid within coalescer channel 41. As will be known to those skilled in the art, the skimmer 55 comprises a slotted pipe across the flow channel 41 with the edge of the slot facing the flow direction, the slot being located just at the water and floating oil interface, so that suspended oil is captured in the pipe and directed by gravity towards an outlet in the side of the channel. Oil removed by the skimmer may be permanently removed by directing the removed oil into a retention container (not shown). Alternatively, oil removed by the skimmer may be re-introduced into the reactor or first tank for further metabolization by the microorganisms.

A second skimmer 61 similar in construction to the first skimmer is mounted at the outlet of the coalescer 58, for skimming oil subsequent to coalescing. It will be understood, after the discussion which follows later concerning the preferred coalescer, that the coalescer is operative to coalesce and de-emulsify oily emulsions such that the effluent from the coalescer is likely to consist of oil globules that have begun to agglomerate and migrate to the upper regions of the water flow. The skimmer 61 is thus operative to remove such oil globules as have migrated upwards (vertically) in the water flow to the depth of the skimmer.

The skimmers 55, 61 in the disclosed embodiment may be fixed in location (depth), since the height of the water is determined by the flow volume over the weir spillway 68 at the end of the channel. If flow volumes are changed by throttling the second pump 31, the skimmer pipe may be rotated about its axis to bring the slot in line with the oil/water interface.

Coalescer 58 functions to break up emulsions and to separate oil and other immiscible contaminants from water. Coalescer 58 is preferably comprised of a material that attracts oil and other water-immiscible compounds. More specifically, coalescer 58 comprises a material selected from the group consisting of polypropylene, polynylon, polyester, polyvinyl chloride, polyvinylidene chloride, polytetrafluoroethylene, polyacrylic, polyurethane, and metal. Coalescer 58 comprises one of the above materials in a configuration selected from the group consisting of a plate, baffle, grid, screen, mesh, spool, filter bed, granular bed, batt, and other structural equivalents.

Preferably, coalescer 58 comprises a plurality of evenly spaced apart polypropylene plates, each plate having hi-directional corrugations running both laterally and longitudinally along the plane of the plate forming crests and valleys, the crests and valleys including bleed holes for passage of the immiscible components upwardly. More preferably, the polypropylene plates are arranged horizontally, and the hi-directional corrugations of the polypropylene plates are oriented orthogonally to one another, and are approximately sinusoidal. The most preferred coalescer configuration has been described in U.S. Pat. Nos. 4,897,206 and 3,487,813, which are hereby incorporated by reference. Such coalescers are commercially available from Facet Quantek, Inc., Tulsa, Okla. as coalescing plate separators.

Still referring to FIG. 1, as the oil contaminated water passes into coalescer 58, fine oil droplets are attracted to and joined with other oil droplets on the polypropylene plates to form sheets of oil on the bottom surfaces of the plates as the oil droplets rise. Larger droplets of oil then rise by gravity and pass through the bleed holes in the crests of the plates. The oil droplets continually join larger oil droplets as they pass upward through successive polypropylene plates. The rate the oil droplets rise to the upper levels of water in the coalescer is a function of the temperature of the water, the size of the droplets, and the density differential between the oil and the water. The efficiency of the coalescer 58 is also a function of the rate of flow of the water through the coalescer. The slower the flow, the more efficient the removal of oil and other contaminants from the water.

Once the water has passed through coalescer 58, the water passes under a second dam 64 that is positioned at the outlet of the coalescer and subsequent to the second skimmer 61. The second dam 64 is mounted in the coalescer channel 41 about 18 inches from the end of the coalescer, with an upper side flush with the top of the coalescer channel, and a bottom side spaced apart from the bottom of the coalescer channel about 12 inches and open thereto, to allow water to flow under the second dam. Lower weight components (e.g., coalesced oil droplets or globules) that have migrated to the higher levels of the water in coalescer channel 41 do not generally pass under the second dam 64, and are preferably skimmed by the second skimmer 61 and/or continue to be consumed by microorganisms in the coalescer channel and reactor tank.

After the water has passed under second dam 64, it accumulates in coalescer effluent chamber 67. This chamber 67 is defined by a volume of the coalescer channel 41 subsequent to the coalscer 58 and second dam 64. Huid accumulates in this coalescer effluent chamber 67 until it reaches a predetermined depth sufficient for removal and recirculation. Fluid is removed from the coalescer effluent chamber 67 (a) by a batch valve inlet 77 and batch effluent pipe 83 when operated in the batch mode, or (b) by flowing over a coalescer channel outlet or spillway 68, when operated in the continuous mode. It will be understood that in the continuous mode of operation, a batch valve 80 positioned along the batch effluent pipe 83 is set in the closed position so that water will not enter the pipe. Batch valve 80 and batch effluent pipe 83 will be discussed more fully below.

Generally for operation in the continuous mode, once the water reaches a level within coalescer effluent chamber 67 that is level with the lower edge of coalescer channel outlet or spillway 68, the water exits coalescer channel 41 by gravity, and then flows into a first treatment tank reentry region 73. In this manner, the fluid is reintroduced into the first tank 22. The first treatment tank reentry region 73 is defined within the first treatment tank 22 between a weir 70 and an outlet wall 75 of first treatment tank. The preferred weir 70 extends downwardly from the end of the coalescer channel 41, and into the first tank 22. The outlet wall 75 of the tank is preferably an end of the tank 22 opposite from the end supporting the coalescer channel inlet 42 of the coalescer channel 41.

The water in first treatment tank reentry region 73 then flows past and under weir 70 which has an end position spaced apart from the bottom of treatment tank 22 about 18 inches, where it flows back into aeration region 23 for reaeration and recirculation through the coalescer 58. It will be understood that water reintroduced into the first treatment tank in this manner has been treated with steps of initial aeration, removal to the coalescer, introduction of microorganisms and catalyst, skimming, coalescing, and further skimming subsequent to coalescing. Thus, the water thus treated has at least been partially cleaned, and in some circumstances may be cleaned enough at this stage for removal to subsequent stages of treatment.

The preferred Quantek laminar flow, sinusoidal path plate type coalescer provides particular advantages over other types of coalescers in the present invention. Firstly, the plates usually require infrequent cleaning, on the order of once a year. Secondly, the coalescer is operative to remove oil droplets 20 microns or smaller, compared to 60 microns for tilted plate separators. This enables reduction of effluent oil content to levels less than 15 ppm over a wide range of conditions.

In particular, it is believed that the preferred Alpha microorganisms enhance the operation of the coalescer. It is known that coalescers in general are ineffective with oily emulsions such as is provided from vehicle washes and restaurants, where oils are present in emulsified form due to soaps. Emulsions by definition comprise a liquid containing a dispersed immiscible component in droplets smaller than colloidal size. It has been observed that the Alpha microorganism are operative as de-emulsification agents, perhaps in the process of digesting or consuming the organic oils. Accordingly, the preferred Alpha microorganisms and the preferred Quantek coalescer complement each other to enhance the rate at which oily emulsions are treated in accordance with the invention.

A further consideration involving the coalescer is the flow rate through the coalescer. Preferably, the system should be operated such that the flow through the coalescer is laminar. Under laminar flow conditions, buoyancy forces cause oil droplets to rise until they attach themselves to the oleophilic (oil attractive) plates. The droplets are then coalesced in sheets of oil on the underside surface of the plates. Using closely spaced corrugated plates, a large area of coalescing surface is provided on which small droplets can be coalesced into larger ones. The preferred sinusoidal flow path also promotes a high incidence of droplet collision as the fluid flow constantly changes direction from a downward path to a vertical path. Accordingly, the rate of flow through the coalescer should be monitored and controlled, typically by controlling the second pump 31, with its flow rate $F_2$, to ensure laminar flow.

Other performance considerations relating to the preferred Quantek coalescer, including but not limited to plate spacing, sinusoidal wave height, number of plates, width of plates, length of plates, height of plates, temperature of effluent, application of Stoke's law for determining parameters of rise velocity of oil droplets, etc. are available in the literature supplied by the manufacturer.

Subsequent Treatment Tanks

Still referring to FIG. 1, generally water is removed from the first treatment tank 22 when it accumulates to a predetermined level within the tank. An outlet 97 is provided along the outlet wall 75 at a level below the coalescer channel outlet 68 but generally in the uppermost regions of first treatment tank 22 for removal of the water. Preferably, the outlet 97 is at a height of 51 inches from the bottom of the tank 22. Once the water levels within the first treatment tank 22 reach the lower edge of the outlet 97, the water flows by gravity from first treatment tank 22 through the outlet 97, and is passed through pipe 100 into a second treatment tank 103. It will therefore be understood that the fluid outlet 97 is positioned so that it withdraws relatively cleaner fluid from the first treatment tank.

Preferably, the pipe 100 is an L-shaped pipe that extends from a generally horizontal opening in the outlet wall 75 and thence downwardly about 40 inches into the second treatment tank 103, where it discharges its flow at about 11 inches above the floor of the second treatment tank. In this manner, water is first introduced into the bottom of the second treatment tank, where it is recombined with filtered water reentering the second treatment tank from a third treatment tank, as will be described.

The second treatment tank 103 is the first of a plurality of subsequent treatment tanks, three in the preferred embodiment, used to accumulate water for subsequent treatment, mainly by filtration, and eventual discharge. A second treatment tank 103 and a third treatment tank 127 are used to filter and recirculate water. After water accumulates in the second treatment tank 103 to a predetermined depth, it is pumped through a first filter 115 and into a third treatment tank 127. The water eventually passes by gravity back into second treatment tank 103 to again be pumped through the first filter 115. This filtration cycle is repeated until the water in second treatment tank 103 and in third treatment tank 127 accumulates to a level where it passes by gravity into a fourth treatment tank 136. Water accumulates in the fourth treatment tank 136 until it is pumped through second filter 148, and is then subsequently discharged from system 10.

More specifically, second treatment tank 103 is positioned to receive and accumulate the relatively clean water discharged from the first treatment tank 22 and it abuts first treatment tank 22 along outlet wall 75 of the first treatment tank. By maintaining the flow $F_1$ of pump 16 less than the flow $F_2$ of pump 31, the water exiting the coalester channel over outlet or spillway 68 and subsequently entering the reactor 22 is always the cleanest water in the system at this point to flow into tank 103 via outlet 97. Preferably, the second treatment tank 103 contains a maximum of about 225 gallons of water. Like the first treatment tank, the second tank is fabricated from sheet metal panels welded to a tubular metal base and frame.

Water is removed from the second treatment tank 103 by a third pump 109, which introduces the water into a third treatment tank 127. The third pump preferably has a controllable flow rate $F_3$, which should be adjusted to promote recirculation between the second and third tanks notwithstanding net outflow. The second treatment tank 103 contains a third pump intake 106 which vertically extends about 6 inches from the bottom of the tank and connects to the third pump 109. After the water has accumulated in the second treatment tank 103 to a level above third pump intake 106, the water is drawn through the third pump intake by the third pump 109, and pumped through a first filter 115 positioned along a pipe 118 extending between the second treatment tank 103 and third treatment tank 127.

The first filter 115 comprises a filtration media selected from the group consisting of sand, silica, aluminum sulfate, activated carbon, and diatomaceous earth. A "filter" or the step of "filtering", as the terms are used herein, relate to moving the fluid through a relatively fine mesh or chemically active filtration process, and does not include a gross object type strainer as would be used on pump intakes to prevent large objects or masses from interfering with the pumping.

Still referring to FIG. 1, once the water has passed through first filter 115, the water is pumped through the pipe 118 into an analytical detection device 121. The water is then discharged through a third pump outlet 124 into the third treatment tank 127. The third treatment tank 127 is positioned to receive and accumulate relatively clean water discharged from the second treatment tank 103, and it abuts the second treatment tank 103 along a wall or barrier 130. The third treatment tank 127 preferably contains a maximum of about 225 gallons of water.

The third pump outlet 124 is preferably located in the central, lower region of third treatment tank 127. Preferably, the third pump outlet 124 vertically extends about 6 inches from the bottom of third treatment tank 127.

Once water accumulates to a level within the third treatment tank 127 that is level with the top of the wall or barrier 130, the water passes over first barrier 130 and flows back into the second treatment tank 103. The barrier 130 is located between the third treatment tank 127 and second treatment tank 103, and extends to a height of about 48 inches above the floors of the respective tanks. The barrier 130 leaves a gap $H_1$ of 12 inches from the top extremities of the tanks, defining a spillway from the third treatment tank 127 back into the second treatment tank 103. The water is then recirculated through the first filter 115 and again accumulates in the third treatment tank 127.

It will be appreciated that in general, the cleanest water accumulates in the third treatment tank 127, subsequent to the first filter 115, and rises within the third treatment tank until it accumulates sufficiently to be recirculated by gravity back into the second treatment tank 103.

The analytical detection device 121 is utilized to monitor water quality, and thus contaminant removal, in water transported between the second treatment tank 103 and the third treatment tank 127. The preferred detection device is a model Mark VIII manufactured by Facet Fluid Technology Group located in Oklahoma City, Okla. This equipment, which is known to those skilled in the art, allows monitoring of the concentrations of contaminants in the water passing between the second and third treatment tanks by utilizing light scattering techniques.

The water is recycled between the second treatment tank 103 and the third treatment tank 127 through the filter 115 until the water is determined to be below a threshold level of contamination as determined by analytical device 121. For example, when the water is determined to contain no more than about 5 ppm of detected solids, the water may be considered sufficiently clean for re-introduction into fresh water wetlands, in accordance with current EPA regulations that permit no more than 15 ppm oil and grease, 200 mg/L (ppb) BTEX (benzene, toluene, ethylbenzene, and xylene), 620 mg/L (ppb) naphthalene, and 50 ppm suspended solids.

In the disclosed embodiment, the contaminant concentration is measured manually with the analytical device 121 on a periodic basis, and the pumps are actuated manually when the water quality reaches the indicated or desired level of cleanliness. Alternatively, the analytical detection device may include an automatic control mechanism for controlling the flow rate of the pumps in an automated manner in response to the level of the contaminants in the water. Generally, water continues to accumulate in the second treatment tank 103 and the third treatment tank 127 until the water level reaches and exceeds the height of the barrier 133 dividing the two tanks 103 and 127 from a fourth tank 136.

To this point water on a continuous flow has entered the first tank 22 and proceeded into tanks 103 and 127 until tanks 103 and 127 overflow into the fourth tank 136. With a continuous flow rate of 15 gpm into the disclosed 1000 gallon reactor 22 and the two filter tanks 103 and 127 of 225 gallon capacity each, it is generally expected that a total time of approximately 90 minutes will elapse prior to overflow into the fourth tank 136.

Still referring to FIG. 1, a fourth treatment tank 136 is positioned subsequent to the third treatment tank 127, for further accumulation and storage of cleaned water from prior stages. The fourth treatment tank 136 and the third treatment tank 127 are separated by a second wall or barrier 133. The barrier 133 preferably extends 49 inches from the bottom of the tank, leaving a gap $H_2$ of about 11 inches from the top extremities of the tanks, thereby defining a spillway from the third treatment tank 127 into the fourth treatment tank 136.

Once the water has accumulated within third treatment tank 103 and second treatment tank 127 to the level of the top of second barrier 133, the water then spills over the second barrier 133 into fourth treatment tank 136. It will be understood that the top of second barrier 133 is higher than the top of first barrier 130 so that the water that has collectively accumulated in the second treatment tank 103 and third treatment tank 127 will then pass over barrier 133 and accumulate in the fourth treatment tank 136. Water will not accumulate to this level until it has been treated for a sufficiently long time to be repeatedly filtered through the filter 115.

The fourth treatment tank 136 includes a fourth outlet 138 located in the lower region of the tank for withdrawing water. The fourth outlet 138 vertically extends about 6 inches from the bottom of fourth treatment tank 136, and is generally positioned in the center of the bottom of the tank. Preferably, the fourth treatment tank 136 contains a maximum of about 100 gallons of water. It will be understood that fourth treatment tank 136 abuts third treatment tank 127 along the second barrier 133.

The water in the fourth treatment tank 136 is then withdrawn through the fourth outlet 138, through pipe 139, and is pumped by a fourth pump 142 through a second and final filter 148 for final discharge. The fourth pump preferably has a controllable flow rate $F_4$, typically at about the same rate as the first pump $F_1$ so that overflow does not occur in the system.

The second filter 148 may be considered a "polishing" filter and preferably comprises a filtration media selected from the group consisting activated carbon, and mixed media of other materials such as activated aluminas for removal of inorganic and organic compounds in an adsorption manner. Preferably, the filtration media in the second filter 148 is different from the filtration media in first filter 115 so as to remove different residual contaminants. The clean water then passes through pipe 151, and is then discharged from apparatus 10.

Figure 2:
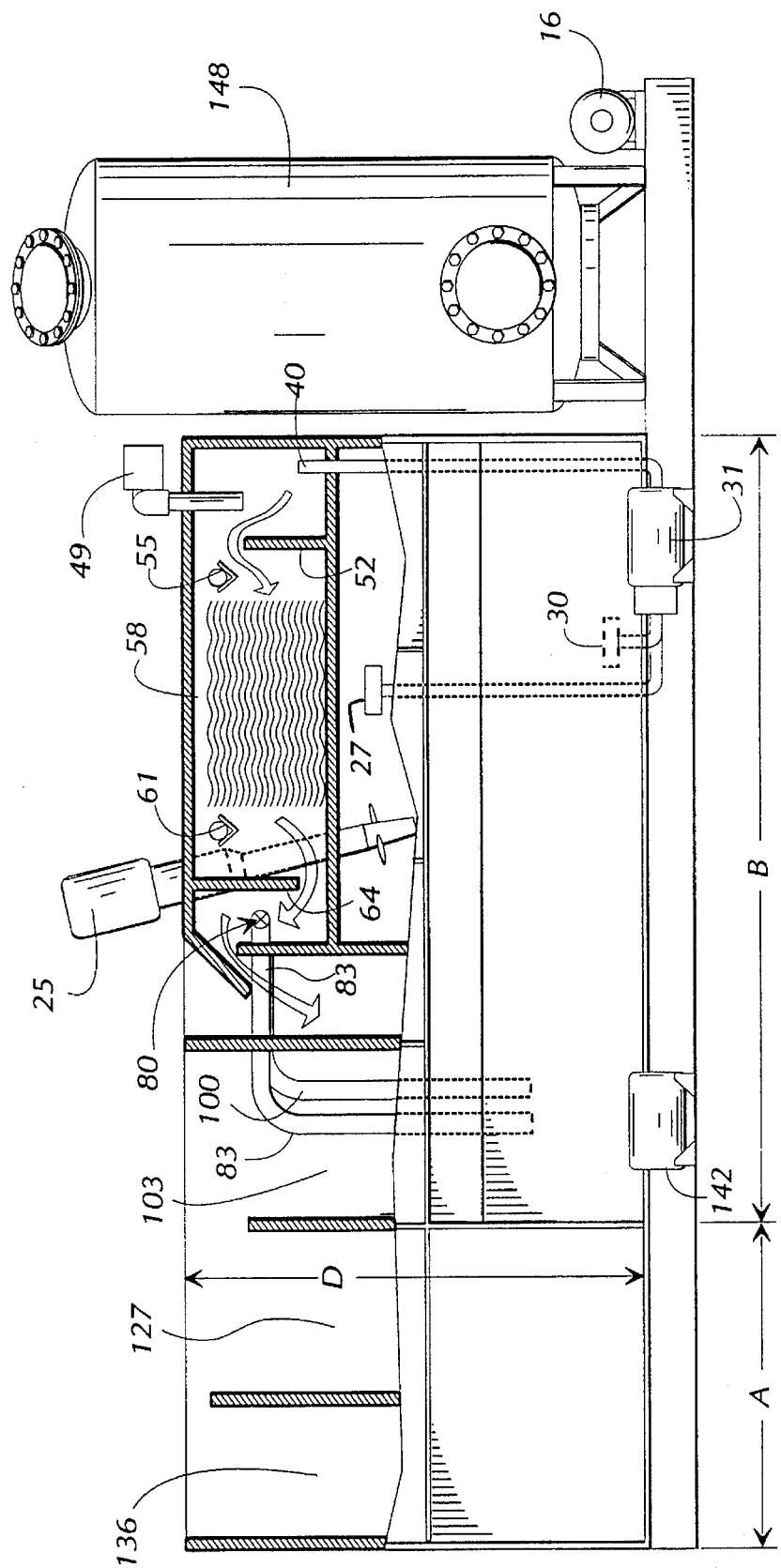
FIG. 2 is a side elevation view, partially cut away, of the preferred system of FIG. 1.
Figure 3:
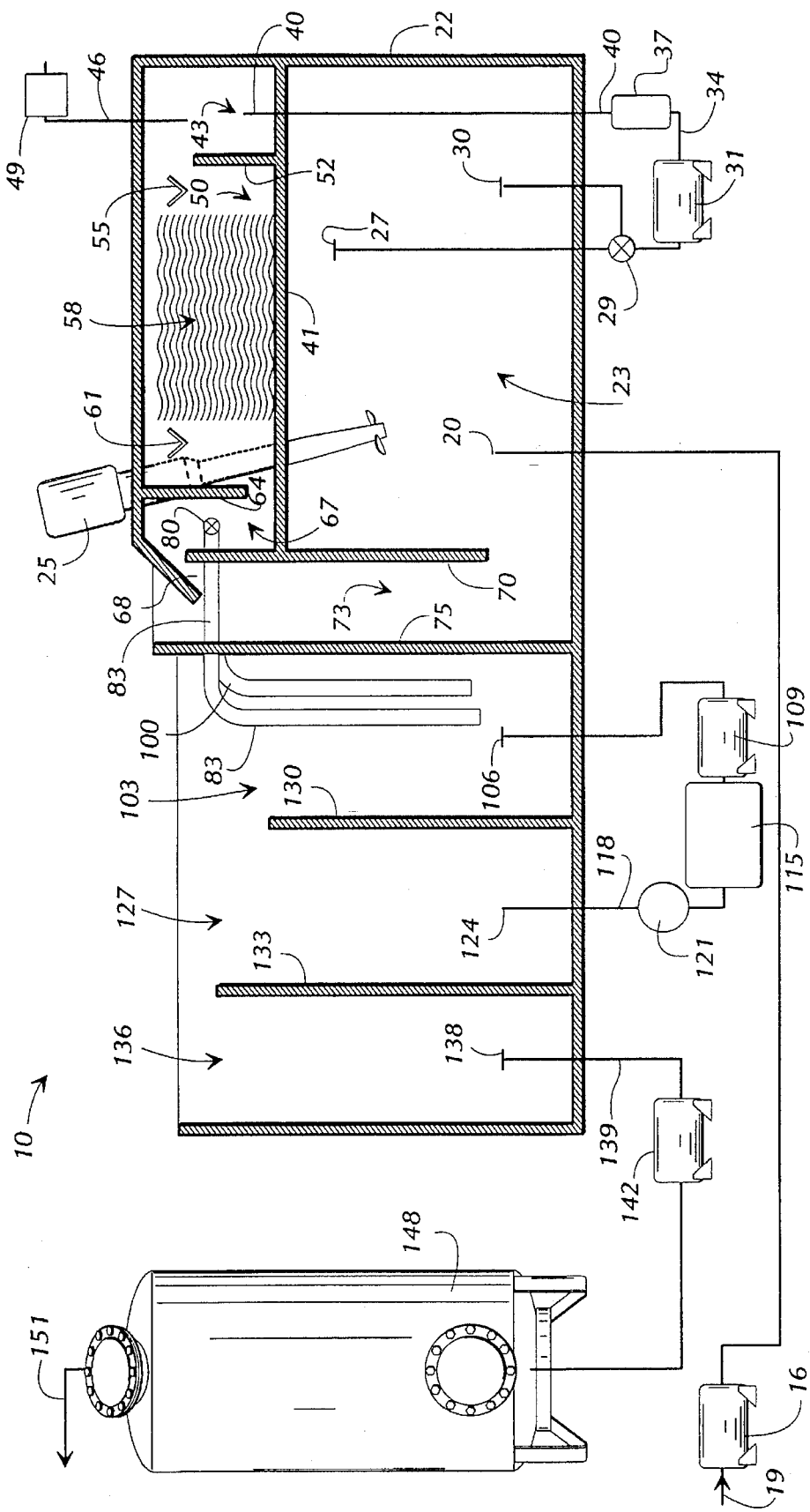
FIG. 3 is a block diagram view of a system for the separation of immiscible components mixed in water according to the preferred embodiment of the present invention as shown in FIG. 1.
Figure 4:
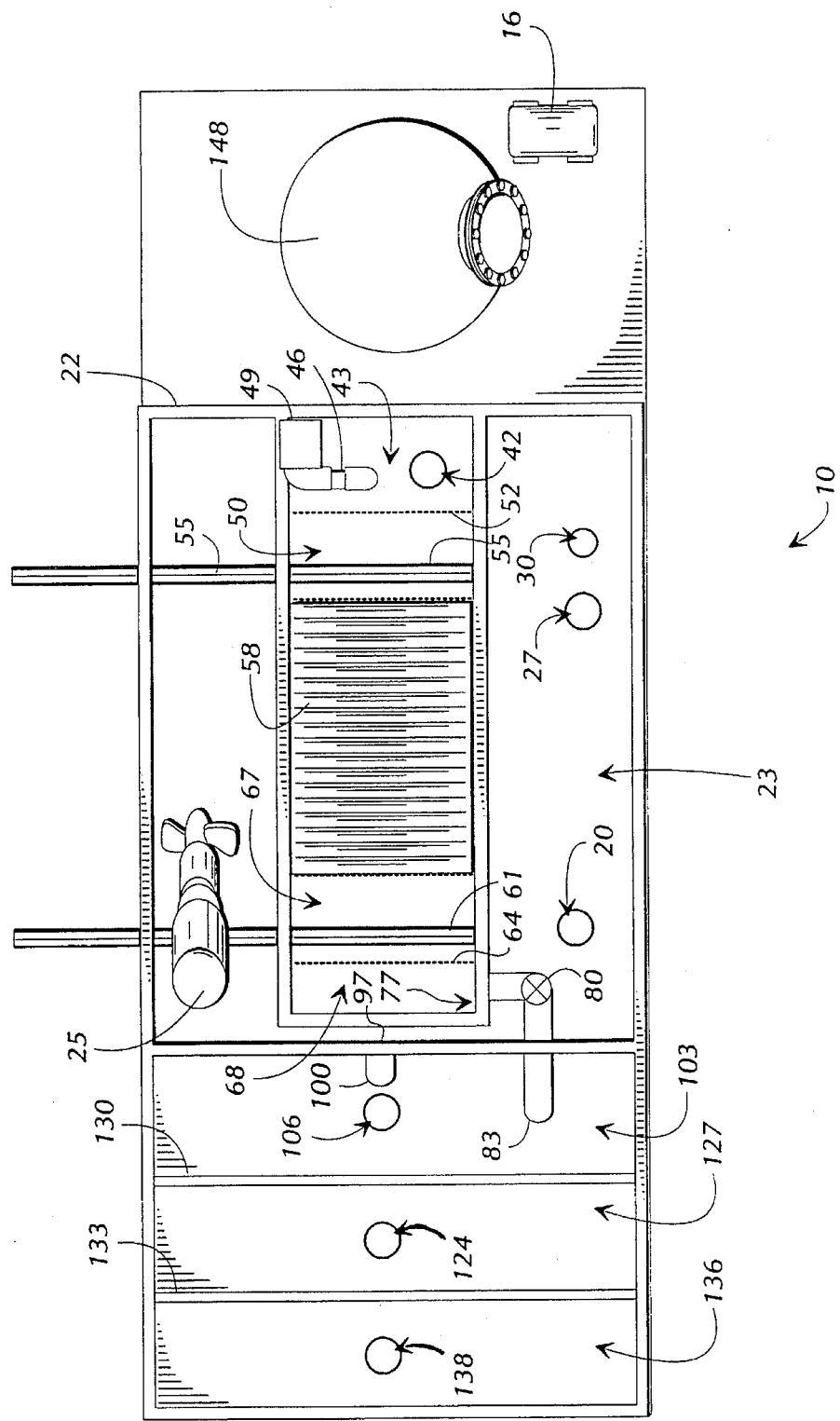
FIG. 4 is a top plan view of an apparatus for separating immiscible components mixed in water of the preferred embodiment shown in FIG. 1.

As best seen in FIG. 2, the second filter 148 is preferably a large, replaceable cartridge carbon water polishing filter unit such as a model 275 manufactured by Transchem Industries, Inc. located in Atlanta, Ga. Preferably, the second filter 148 is mounted in an upright position on the frame of the system, so that the entire system can be manufactured and shipped as an integral unit.

Flow Rates, Capacities, and Other Considerations

It will be understood that the present invention can be fabricated in varying sizes and capacities, depending upon various considerations of processing rate, reaction time, size, weight, portability, etc. As specific examples of various sizes of a system constructed in accordance with the present invention, the following Table 1 illustrates various rates at which a system can receive contaminated influent (in gallons per minute or GPM), contain a quantity of fluid to be treated in the first treatment tank (total gallons), and estimated reaction times for cleaning the fluid given a normal dosage of microorganisms and catalyst. The dimensions illustrated correspond to the various dimensions shown in the various drawing figures:

TABLE 1

| Flow rate (Reactor volume) | Dimensions in Feet | | | | Reaction Time |
|---|---|---|---|---|---|
| | A | B | C | D | |
| 5 GPM (1,000 Gal.) | 2'-6" | 11'-0" | 4'-6" | 5'-6" | 3 Hours |
| 10 GPM (1,200 Gal.) | 2'-6" | 13'-0" | 4'-6" | 5'-6" | 2 Hours |
| 15 GPM (1,800 Gal.) | 2'-6" | 15'-0" | 5'-6" | 5'-6" | 2 Hours |
| 20 GPM (2,700 Gal.) | 3'-0" | 15'-0" | 6'-6" | 6'-0" | 2 Hours |
| 30 GPM (3,800 Gal.) | 4'-0" | 15'-0" | 7'-6" | 7'-6" | 2 Hours |

The following Table 2 illustrates the selection and arrangement of the preferred Quantek corrugated coalescers, in stacks or units of a plurality of plates, with associated design parameters. In this table, the flow rates set forth in Table 1 are related to the preferred configuration of coalescer, where each stack foot comprises a stack of corrugated Quantek coalescer plates one foot high, one foot wide, and two feet long. Thus, in the first entry, two stack feet comprises a coalescer that presents a surface area of 1 square foot (1 foot high by 1 foot wide), four feet in length, consisting of two separate one stack foot units.

TABLE 2

| COALESCING OPTIMIZATION | |
|---|---|
| 5 GPM *(12.5 GPM, Max.) | (2) Stack Feet 330 ft.$^2$ coalescing area Design Velocity -.67 ft./min. |
| 10 GPM *(25 GPM, Max.) | (4) Stack Feet 660 ft.$^2$ coalescing area Design Velocity - .67 ft./min. |
| 15 GPM *(37 GPM, Max.) | (6) Stack Feet 990 ft.$^2$ coalescing area Design Velocity -.67 ft./min. |
| 20 GPM *(50 GPM, Max.) | (8) Stack Feet 1,320 ft.$^2$ coalescing area Design Velocity -.67 ft./min. |
| 30 GPM *(75 GPM, Max.) | (12) Stack Feet 1,980 ft.$^2$ coalescing area Design Velocity -.67 ft./min. |

*NOTE:
All channels are preferably designed for 39% of maximum frontal area flow and 250% allowable safety factor for emulsification & temperature range As previously described, four different pumps are utilized in the preferred embodiment, a first pump 16 for introducing fluid into the system, a second pump 31 for transferring fluid from the first tank 22 to the coalescer channel 41, a third pump 109 for moving the fluid through the first filter stage 115 and into the third tank 127, and a fourth pump 142 for removing the fluid from the final or fourth tank 136. If these pumps have flow rates of $F_1$, $F_2$, $F_3$, and $F_4$, respectively, the following flow relationships are preferred:

$F_2 > F_1$ $F_3 >> F_1$ (2 to 3 times)

$F_4 \geq F_1$

With such flow relationships, the outflow will match the inflow, and the second and third pumps ($F_2$, $F_3$) will produce substantial recirculation of fluid within the coalescer stage and filtration stages.

It will be understood that the positions of second treatment tank 103, third treatment tank 127, and fourth treatment tank 136 may be rearranged to form different configurations. For example, referring now to FIG. 7, it will be seen that the fourth treatment tank 136' may be abutted to a side of the third treatment tank 127 instead of to an end. In the embodiment shown in FIG. 7, the fourth tank 136' abuts both the second treatment tank 103 and third treatment tank 127. In such an embodiment, preferably the second barrier 133' separates the fourth treatment tank 136' from second treatment tank 103 and from the third treatment tank 127. The top of the second barrier 133' remains higher than the top of first barrier 130. Since water does not flow over the barrier 133' until both the tanks 103, 127 are full, the barrier 133' may extend at the same height along the boundary between the fourth tank 136' and the tanks 103, 127.

Figure 7:
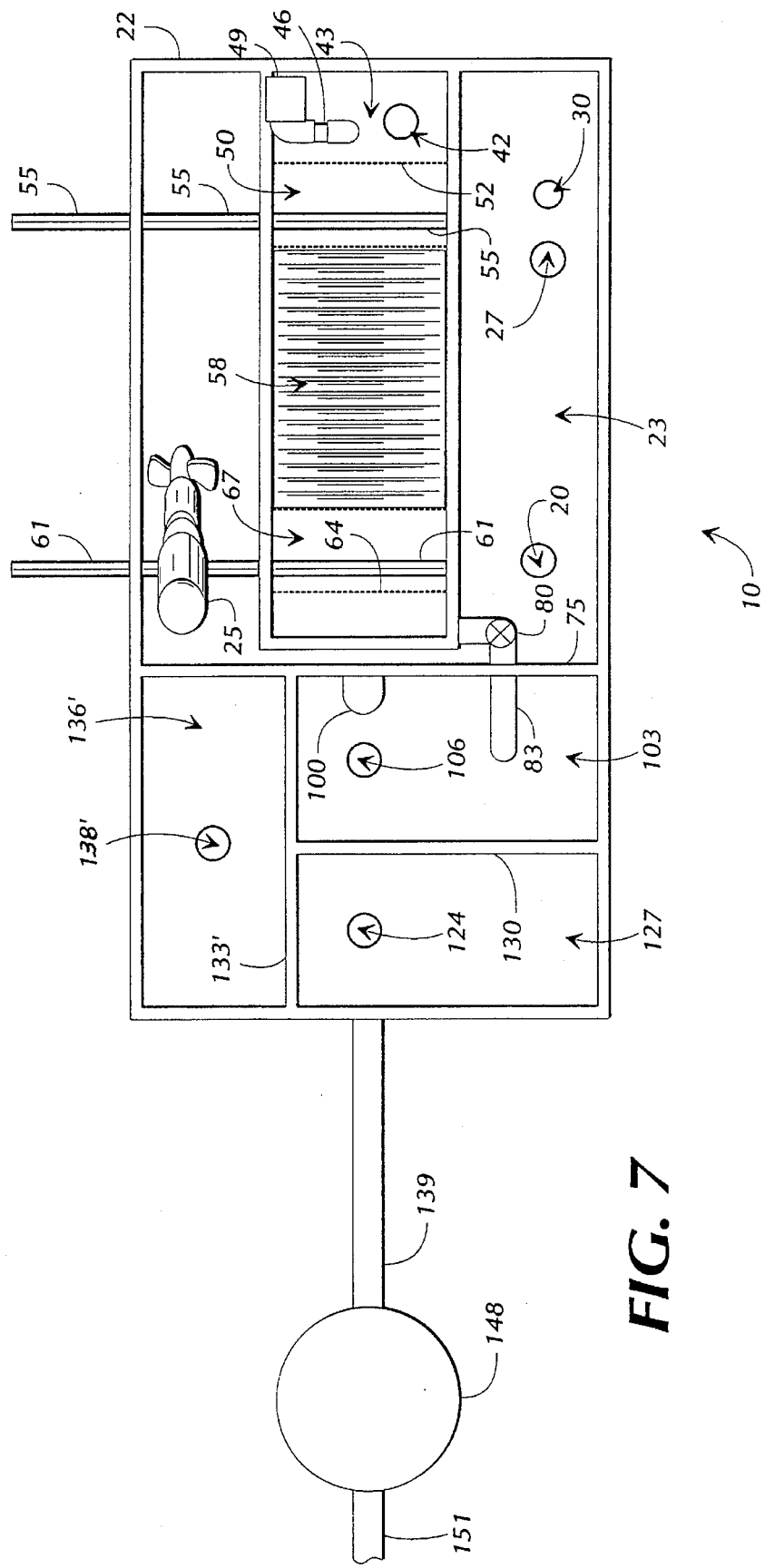
FIG. 7 is a top plan view of another embodiment of the apparatus for separating immiscible components mixed in water.

It will therefore be understood that the alternative configuration illustrated in FIG. 7 does not alter the water treatment method as described above for the embodiment illustrated in FIG. 1. The path of the flow of water in the embodiment illustrated in FIG. 7 differs only slightly from the embodiment illustrated in FIG. 1. Once the level of water in second treatment tank 103 and third treatment tank 127 reaches the level of the top of barrier 133', the water passes over barrier 133' into fourth treatment tank 136'. The water flow before and after this step remains the same as the water flow in the embodiment illustrated in FIG. 1.

The output quality of water treated in accordance with the system described above will vary as a function of several variables, including the concentration and types of contaminants, the flow rates, the quantity and type of microorganisms, the quantity and constituents of catalyst, the temperature, the cleanliness of the filters, etc. Specific examples of various types of waste streams and treatment regimens are set forth as follows:

EXAMPLE 2

A waste water stream consisting of soap-emulsified oils derived from a tractor/trailer/car wash was treated with the present invention. The waste water was highly emulsified and contained 250 ppm of motor oil, 5 ppm of gasoline, 10 ppm of diesel fuel, and 5 ppm of other organic constituents including benzene and other hydrocarbons. A flow of 5 gallons per minute were introduced into the system. A total of 2,400 gallons of the waste water were treated during a 1 day period.

Alpha microorganisms were introduced into the system at the rate of 1 pound of dry powdered form every 2 weeks. BIO-CATALYST type microorganism catalyst was introduced into the system at the rate of 5 gallons every 24 hours. The treatment regimen was maintained for 30 days. The temperature in the system was maintained at between 60° F. and 90° F.

The waste stream was monitored for concentration of oils every 72 hours. The concentration of oils and organics was found to be at the following levels at the following times:

| Time | Oil concentration (ppm) |
| --- | --- |
| 2 hours | <100 ppm |
| 24 hours | <5 ppm continuous |

After 2 hours, the oil concentration was deemed within EPA limits for introduction into a sanitary sewer without further treatment, namely, 100 or less ppm, and the cleaned water removed from the system.

EXAMPLE 3

A waste water stream derived from a poultry rendering plant was treated with the present invention. The waste water contained insoluble fats and greases in concentrations of 550 ppm of animal fats and 5200 ppm of other organic constituents defined as BOD. A flow of 5 gallons per minute were introduced into the system. A total of 2000 gallons of the waste water were treated during a 1 day period.

Alpha microorganisms were introduced into the system at the rate of 1 pound of dry powdered form every 96 hours. BIO-CATALYST type microorganism catalyst was introduced into the system at the rate of 5 gallons every 24 hours. The treatment regimen was maintained for 4 days. The temperature in the system was maintained at between 60° F. and 90° F.

The waste stream was monitored for concentration of fats and oils every 24 hours. The concentration of fats and oils was found to be at the following levels at the following times:

| Time | Oil concentration (ppm) |
| --- | --- |
| after 24 hours | <50 ppm |
| continuous flow | <250 ppm BOD |

After 96 hours, the oil concentration was deemed within EPA limits for introduction into a sanitary sewer without further treatment, namely, <100 ppm, and the cleaned water was being removed on a 5 gpm continuous basis after a 96 hour initial reaction period.

It will be understood that all filters, heaters, aerators, and pumps should be operated in a manner conducive to the growth of microorganisms. Also, pumps 16, 31, 109, and 142 should be operated at a rate slow enough to maximize the efficiency of coalescer 58 yet also fast enough to rapidly clean the contaminated water. Preferably, the pumps are operated so that the flow rate of the water in apparatus 10 is between approximately 5 to 30 gallons/minute.

In addition to flow rate control for ensuring a compatible microorganism environment, it should also be understood that the preferred embodiment is constructed to provide one or more quiescent zones wherein water being treated is quieted. Such quiescent zones are believed to enhance the breaking and separation of emulsions. In the quiescent zones, the microorganisms, which are aerobic, can rise to the surface and receive further oxygen. In particular, and referring to FIG. 1, quiescent zones occur at the following locations: at the entry to the coalescer past the first dam 52

(which is believed to be the principal operative quiescent zone), at the exit of the coalescer adjacent the second dam 64, and immediately beneath the coalescer channel 41 (and in particular, adjacent to the weir 70 but prior to the aeration region 23).

A further quiescent zone occurs in the third tank 127 prior to overflow and return to the second tank 103; the microorganism are still present and active in the fluid and are still operative. Generally, quiescent zones exist at all top surfaces of fluid where overflows or spills are not occurring, since oils will tend to rise to the surface, where the aerobic microorganisms will continue their consumption and reduction action. It is also believed that the overflow and spilling action of fluid transfer between coalescer channel 41 and the first tank 22, between the third tank 127 and the second tank 103, and between the filled second and third tanks into the fourth tank 136, further aerate the fluid and promote the consumption of oil by the aerobic microorganisms. As mentioned earlier, the preferred catalyst assists the microbes to thrive and function in under substantially anaerobic conditions, which typically persist in the bottom of the tanks, the interior of filter vessels, and other locations lacking a direct air/water interface.

In some applications of the present invention, it may be necessary to remove inorganic or particulate materials from the waste stream prior to introducing the water into the system. Therefore, and referring to FIG. 1, a preliminary mechanical filter (not shown) may optionally be placed prior to pipe 19. The preferred mechanical filter is a screen, grate, settling pond, or other means that is operative to remove sand, grit, and large particulates from the influent of first treatment tank 22.

Figure 5A:
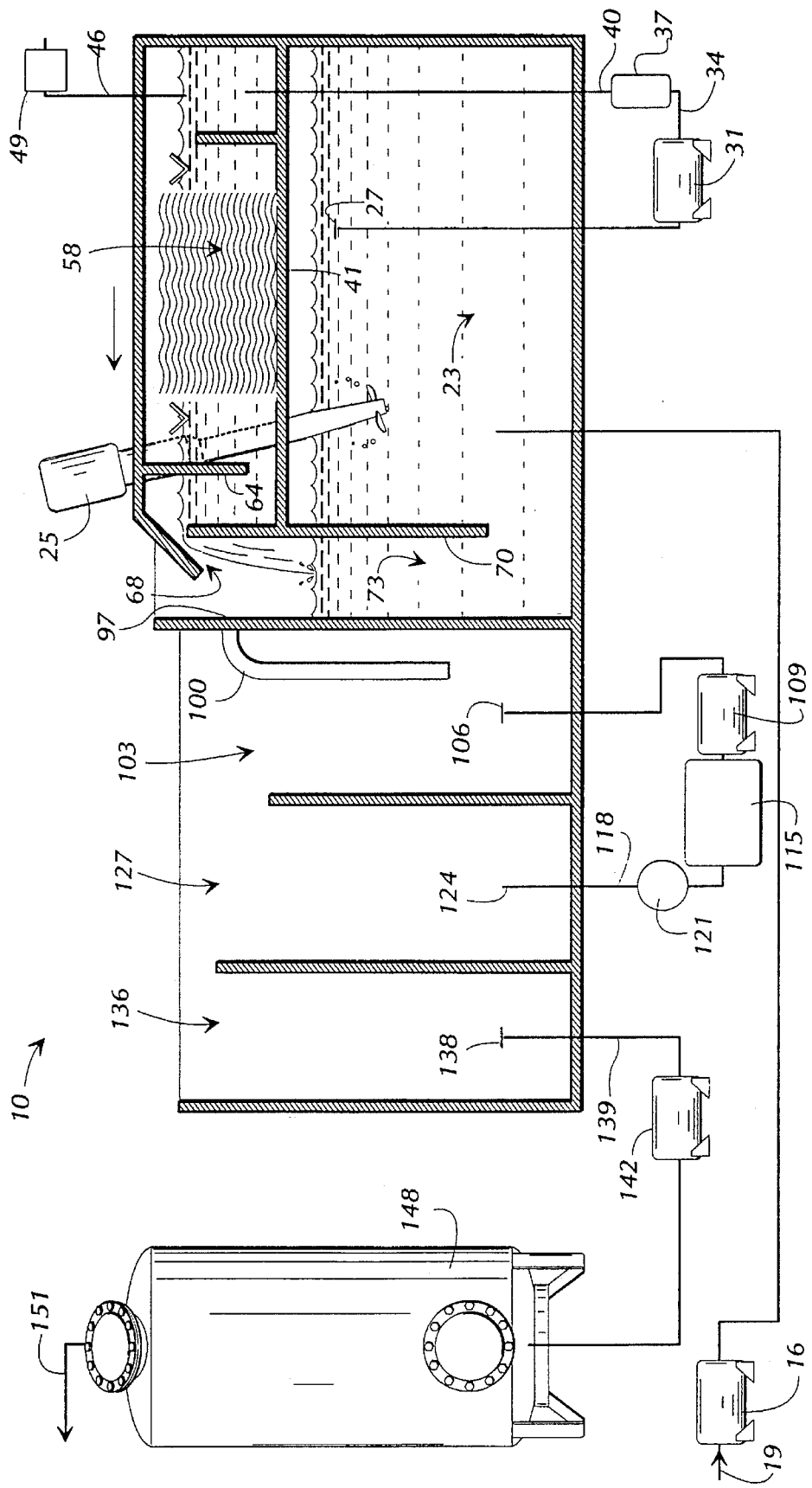
FIGS. 5A–5H illustrate the apparatus for separating immiscible components mixed in water in various stages of the continuous mode of operation of the preferred embodiment as shown in FIG. 1.

FIGS. 5A–5H demonstrate the passage of water through the preferred system 10 illustrated in FIG. 1 while the apparatus is operated in the continuous mode of operation. Referring first to FIG. 5A, it will be observed that a sufficient quantity of water has been pumped into first treatment tank 22 so that the water level within the aeration region 23 is above the level of the first pump intake 27, and the second pump 31 has pumped water through fluid heater 37 and into the coalescer channel 41. Within the coalescer channel 41, the water passes through the coalescer 58, passes under the second dam 64, and then exits through the coalescer channel outlet 68. Upon leaving the coalescer channel, the fluid passes into the first treatment tank reentry region 73 where it flows under weir 70 and is then reaerated by aerator 25.

Figure 5B:
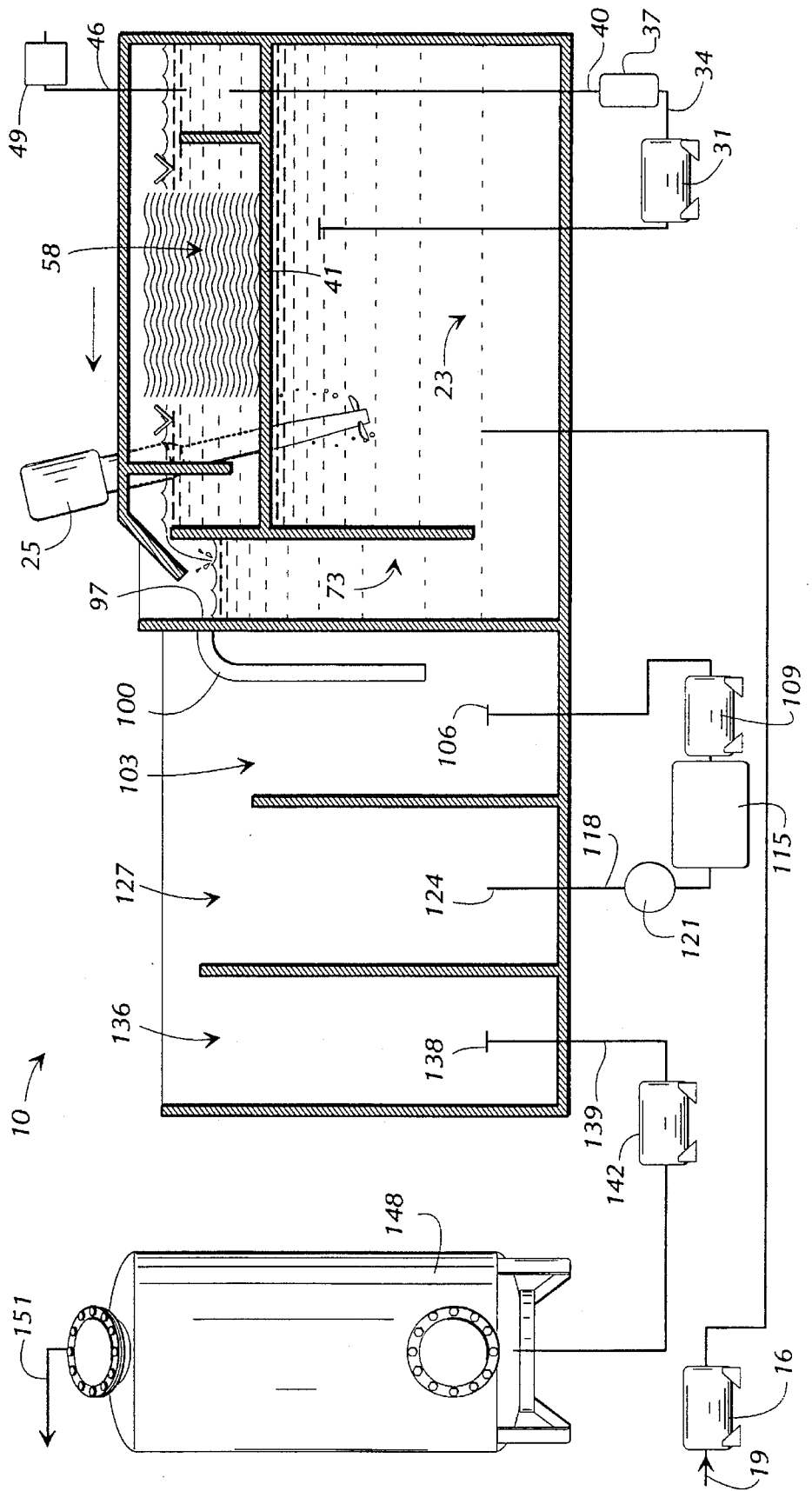

Referring now to FIG. 5B, the water levels within the first treatment tank 22 are just below first treatment tank outlet 97. The water is continually drawn from aeration region 23 by pump 31, and is pumped through the fluid heater 37 and discharged into coalescer channel 41. The water then passes through the coalescer 58, and then flows by gravity back into the first treatment tank 22 where it is again reaerated and recirculated through coalescer channel 41. Additional water may be introduced into the system until the level of the water in the first treatment tank 22 reaches the lower edge of the first treatment tank outlet 97.

Figure 5C:
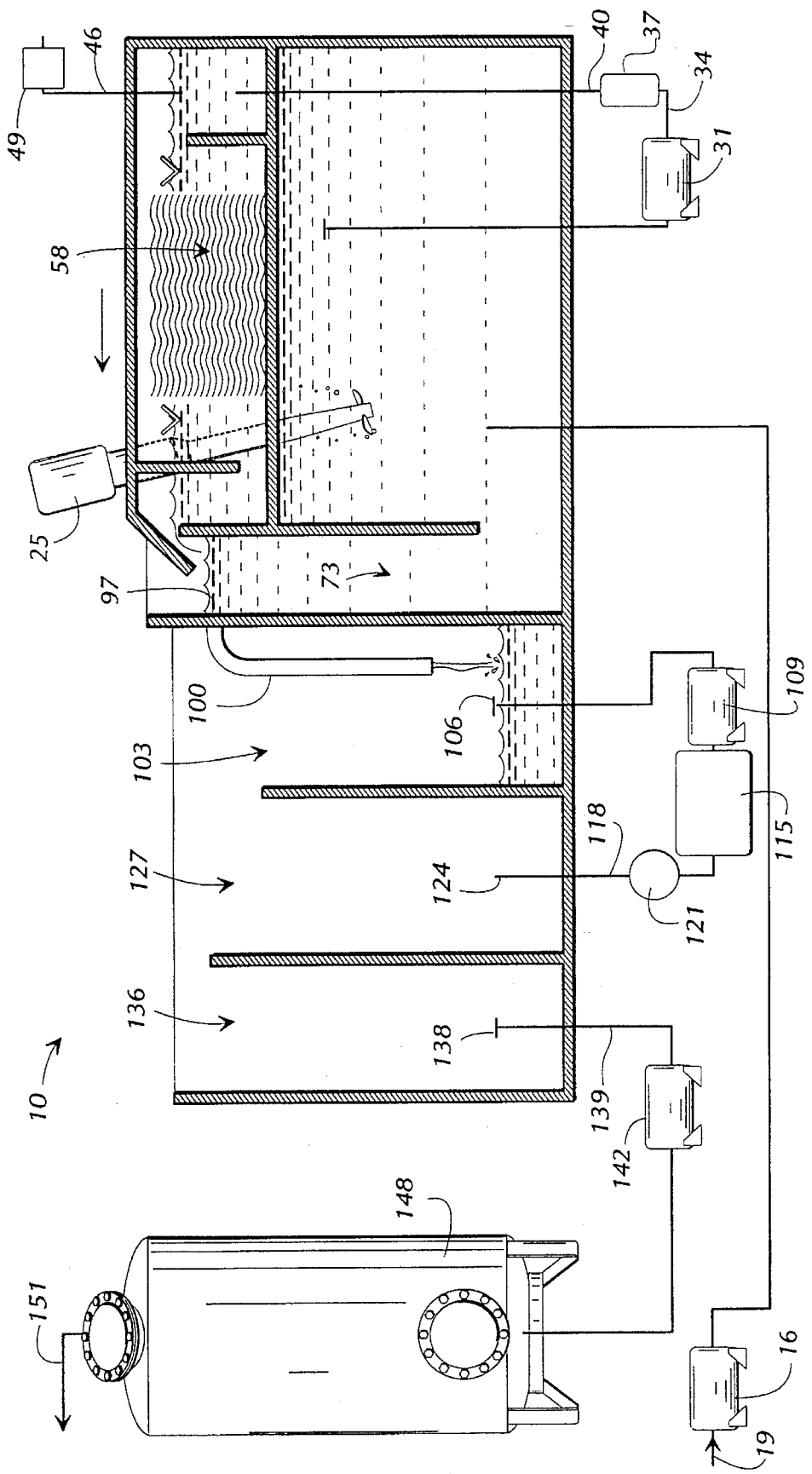

Referring now to FIG. 5C, it will be seen that the water level in the first treatment tank 22 has reached the lower edge of the first treatment tank outlet 97. The water then flows by gravity through the pipe 100 into the second treatment tank 103. The water is accumulated in the second treatment tank 103 until the water reaches the level of third pump intake 106.

Figure 5D:
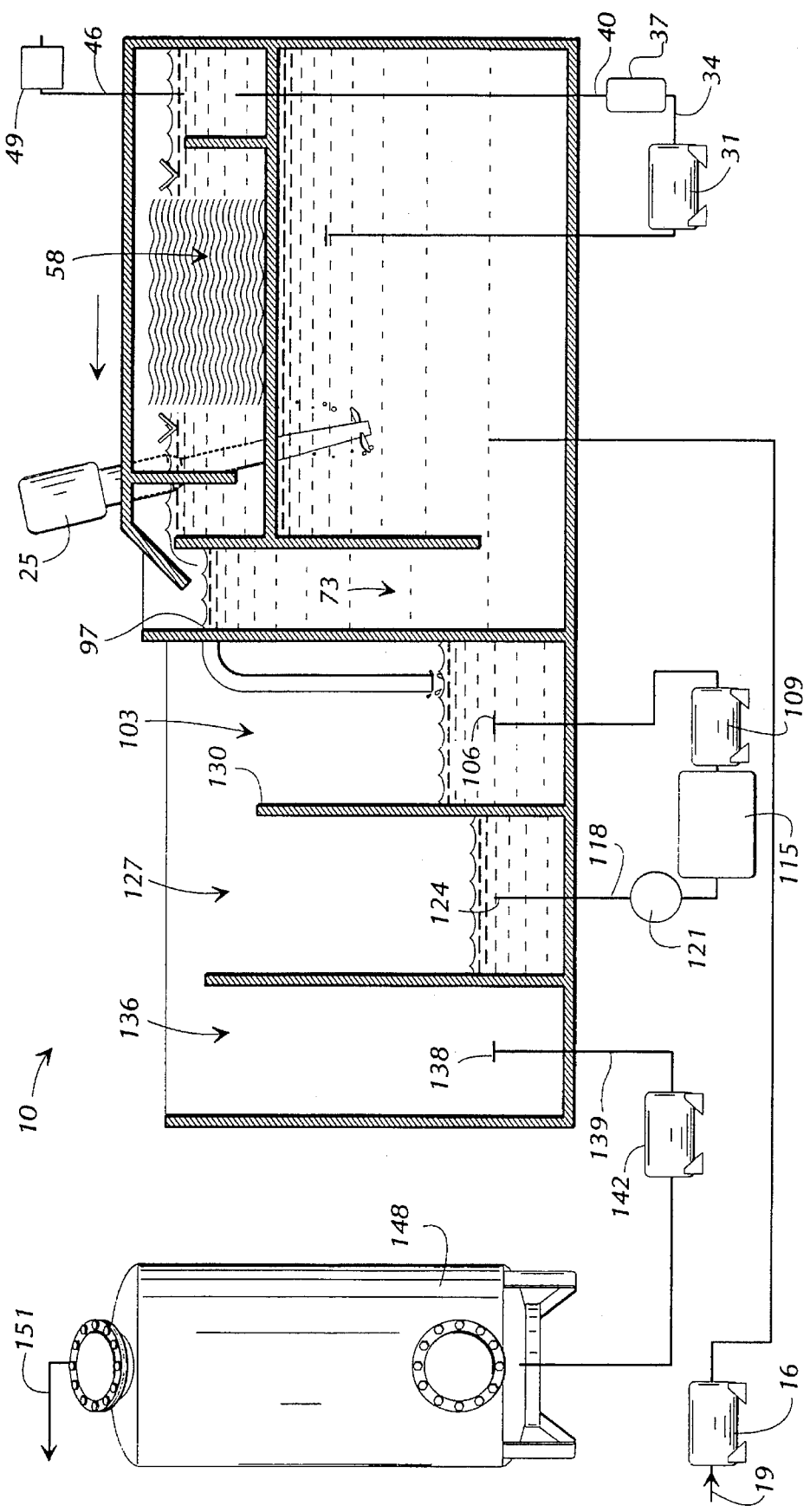

Referring now to FIG. 5D, it will be observed that the water in second treatment tank 103 has exceeded the level of third pump intake 106. Once the water has exceeded the level of third pump intake 106, the third pump 109 pumps the water from the second treatment tank 103 through the first filter 115, and then through analytical detection device 121. The water is then discharged into the third treatment tank 127.

Figure 5E:
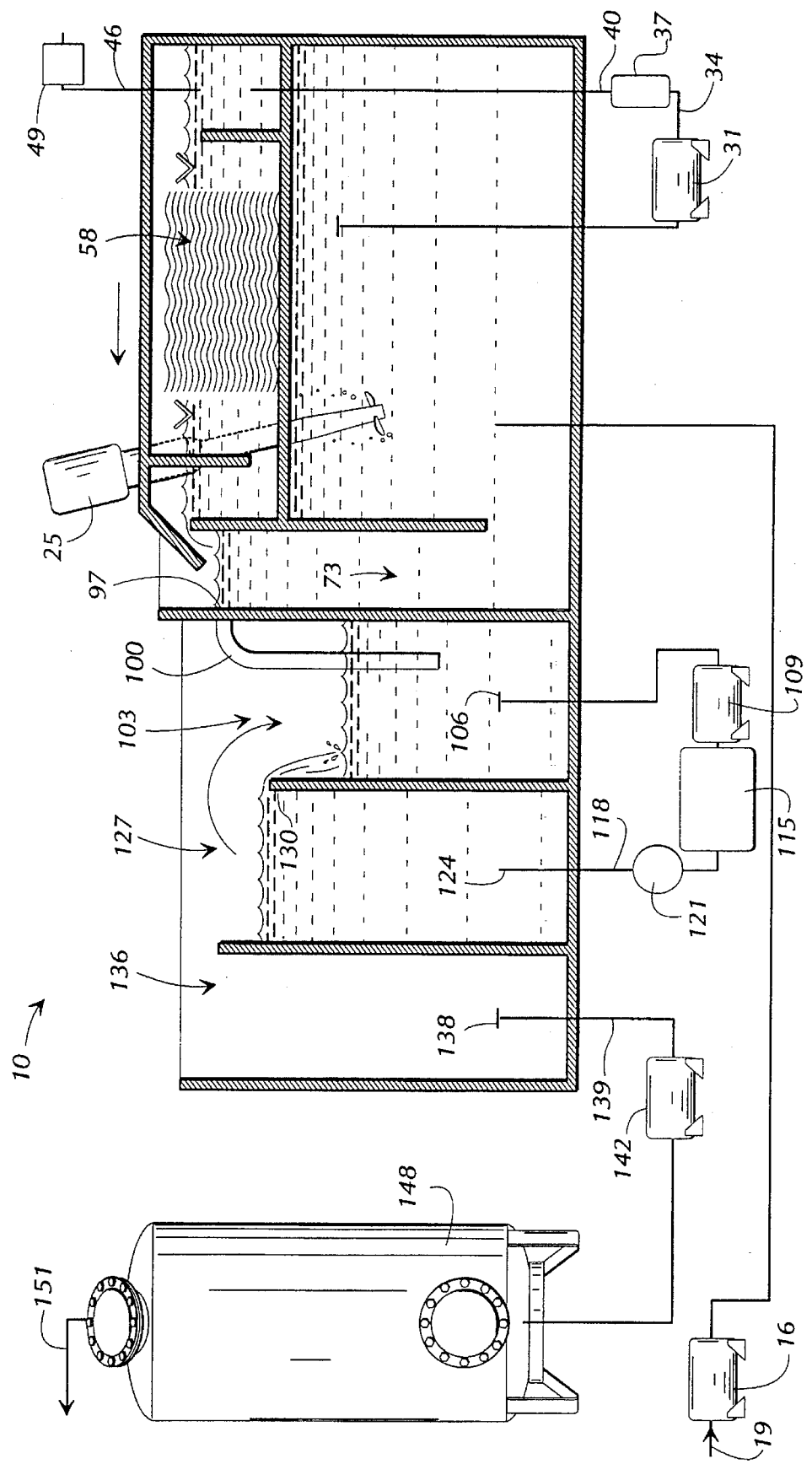

Referring now to FIG. 5E, it will be seen that the water in the third treatment tank 127 has reached the level of the top of barrier 130, and now flows by gravity back into the second treatment tank 103. Once the water has returned to second treatment tank 103, it is recycled through the first filter 115 and analytical detection device 121, and then discharged back into the third treatment tank 127.

The analytical detection device 121 is periodically monitored, either manually or automatically. Dependent on the contamination levels remaining in the water as determined by the analytical detection device 121, the flow rates of the first pump 16 or the second pump 31 are adjusted, either manually or automatically, in order to either (1) continue the recycling filtration step between the second treatment tank 103 and the third treatment tank 127, or (2) accumulate the water in both second treatment tank 103 and third treatment tank 127 to a continually rising level which exceeds the first barrier 130. In the former situation, the recycling and recirculation is continued since the water has not reached a quality level sufficient to permit removal to the fourth treatment tank 136 and ultimate removal from the system.

Figure 5F:
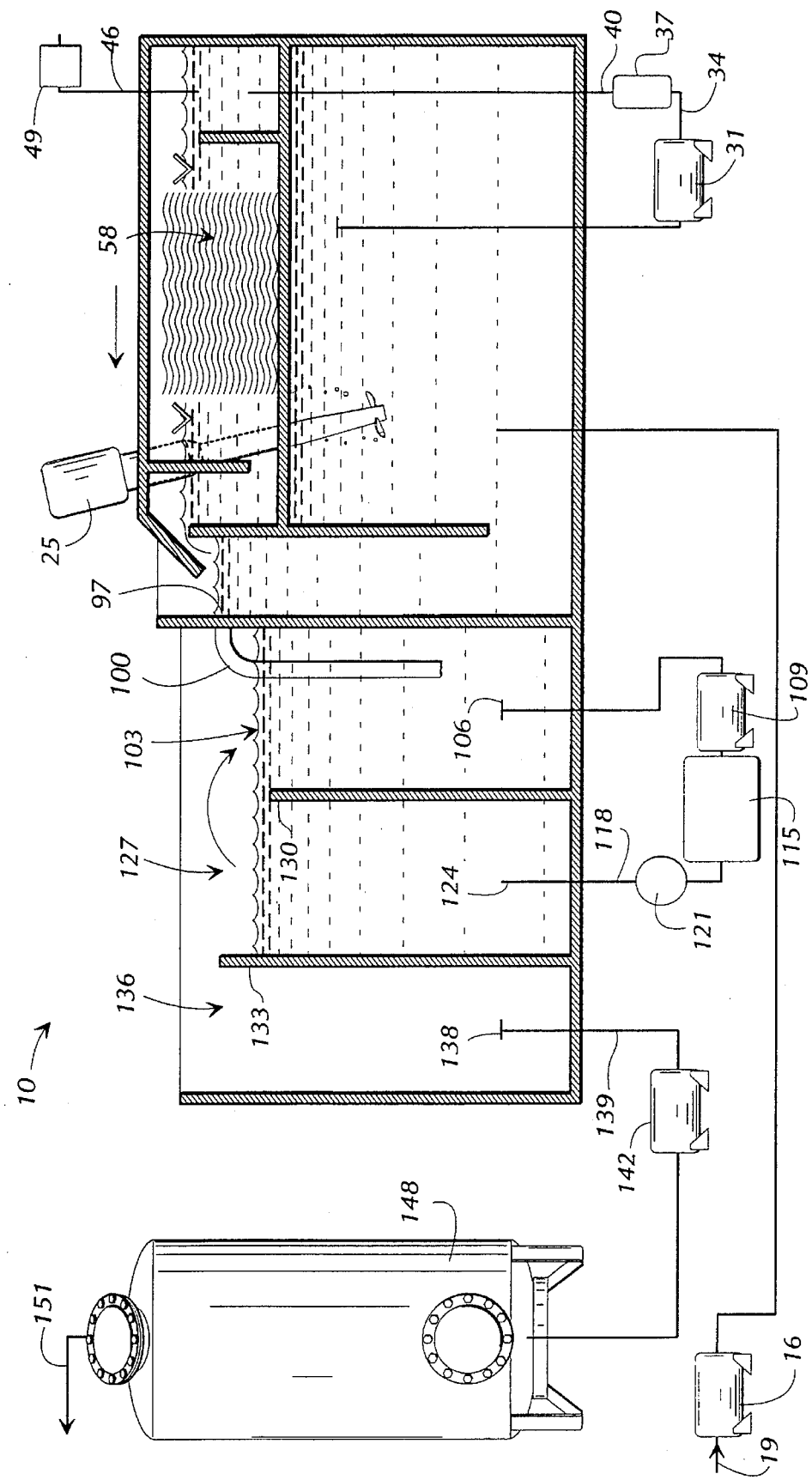

Referring now to FIG. 5F, it will be observed that the water in the second treatment tank 103 and the third treatment tank 127 has accumulated to a level above the first barrier 130. The water continues to recycle through the first filter 115. The water in the second treatment tank 103 and the third treatment tank 127 will continue to accumulate until the water in these two treatment tanks reaches the level of second barrier 133.

Figure 5G:
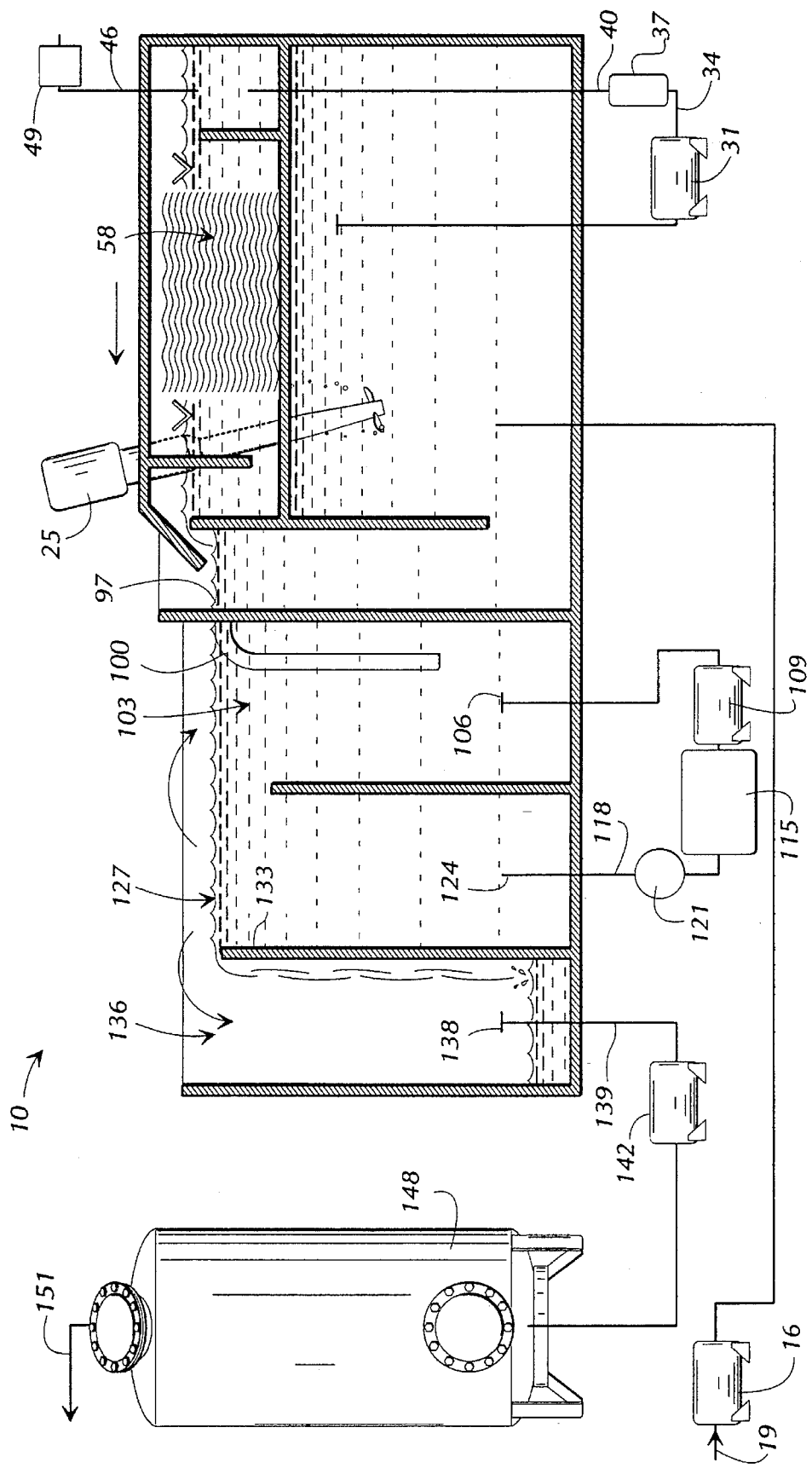

Referring now to FIG. 5G, it will be observed that the water level of the second treatment tank 103 and third treatment tank 127 has reached the level of the top of second barrier 133. The water then flows over the top of the second barrier 133 into the fourth treatment tank 136 where it accumulates until it exceeds the level of fourth outlet 138 and removed from the system by the pump 142.

Figure 5H:
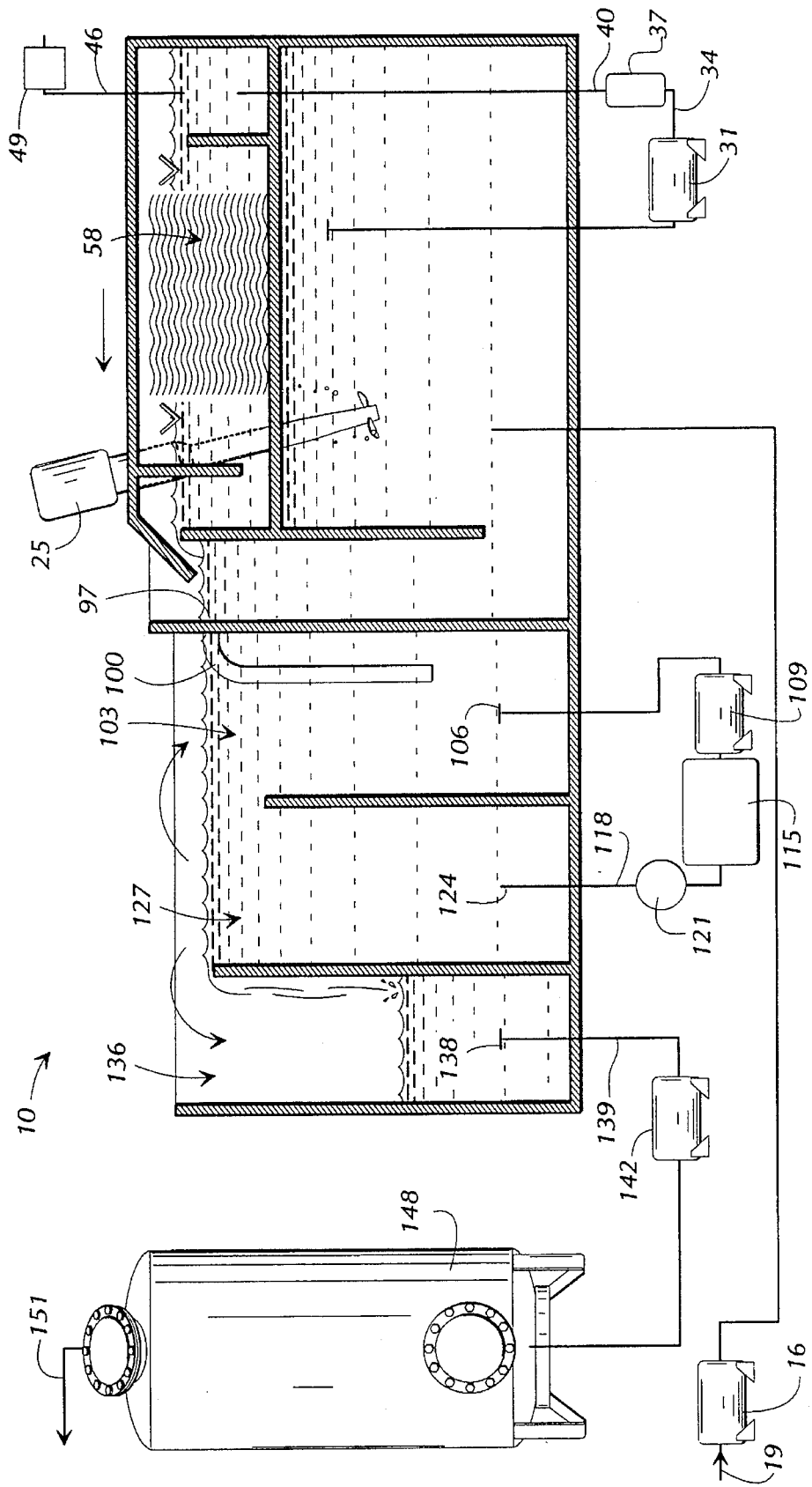

Referring now to FIG. 5H, it will be observed that the water level in the fourth treatment tank 136 has accumulated to a level above the fourth outlet 138. The water above the fourth outlet 138 is then withdrawn from the fourth treatment tank 136 by the fourth pump 142, is pumped through the second filter 148, and is then discharged from the system.

Batch Mode Embodiment

It will be recalled from earlier discussion that the present invention is selectably operative in a batch mode or in a continuous mode. The previous discussion has concentrated on operation in the continuous mode, where contaminated water is continuously introduced into the first treatment tank 22, albeit at varying rates dependent upon treatment results, until an outflow occurs from the fourth treatment tank. In the continuous mode, microorganisms and catalyst are introduced at periodic intervals, so as to maintain continuous treatment.

In a batch mode of operation, a predetermined volume of water is introduced into the first treatment tank 22 and treated until it is ready to pass to subsequent treatment. Briefly summarized, the water is repeatedly circulated for a predetermined length of time through the first treatment tank 22 and the coalescer channel 41. After the water has been aerated and passed through coalescer 58 for the predetermined length of time, or until the water quality has reached a predetermined value, a batch valve 80 (FIG. 1) is opened and the predetermined volume of water is discharged from the coalescer channel 41 through a batch effluent pipe 83 into the second treatment tank 103. The volume of water is then treated in the recirculating filtration stage, and then it is discharged from the apparatus.

In the preferred embodiment, the batch valve inlet 77 is positioned at a depth of the coalescer channel 41 about 6 inches from the bottom of the channel, which is beneath the level of the coalescer channel outlet 68. The batch valve inlet leads to a generally dog-leg-shaped batch effluent pipe 83, which leads outwardly from a side of the coalescer channel 41, turns toward the second treatment tank 103, passes through the outlet wall 75 of the first treatment tank, and then turns downwardly to discharge toward the bottom of the second treatment tank.

The batch mode of operation differs from the continuous mode of operation primarily in that a predetermined quantity of contaminated water is pumped into the apparatus and then treated in the coalescer treatment stage, and then the entire predetermined quantity of water is then treated in the recirculating filtration and subsequent stages. In contrast, the continuous mode of operation involves continuously introducing contaminated water into the apparatus, and as more water is introduced into the first treatment tank 22 the levels of water accumulate until the water levels reach first treatment tank outlet 97. When the treated water levels exceed the level of the outlet 97, the water passes into the second treatment tank 103. In the continuous mode of operation, influent is continually pumped into the apparatus during the filtration stage and even as treated fluid is being discharged from the apparatus.

Another difference between the modes of operation is that in the batch mode of operation, the water level in first treatment tank 22 never reaches the lower level of the first treatment tank outlet 97; the water is removed directly from the coalescer effluent chamber 67 of the coalescer channel 41 by removal via the batch effluent pipe 83.

More specifically, when apparatus 10 is operated in the batch mode, apparatus 10 and its method of use are the same as described for the continuous mode of operation of apparatus 10, with at least two exceptions.

First, in batch mode operation the water is withdrawn from the first treatment tank 22 through a second pump intake 30 which is located at the lowermost regions of the first treatment tank 22. Preferably, the second pump intake 30 vertically extends about 4 inches from the bottom of first treatment tank 22. This allows removal of water from the first treatment tank at a depth shallower than that of the first pump intake 27 (used for continuous mode operation). The water then flows through the batch/continuous mode selection valve 29, when set for operation in the batch mode, and then the water is pumped through the pipe 34 and through fluid heater 37 into coalescer channel 41 by the second pump 31.

Second, in the batch mode of operation, once the water has been circulated through the first treatment tank 22 and coalescer channel 41 for a predetermined length of time or until the water quality is measured at a particular level of contaminants, the water is removed from the coalescer channel 41 through the batch valve inlet 77 and is discharged into second treatment tank 103 via the batch effluent pipe 83.

For the various sizes of embodiments listed in Table I, the reactor volumes and minimum reaction times (in hours) are shown for continuous flow. For batch operations any reactor volume can be "reacted" in the first tank 22 for any period of time depending upon the quality of the waste stream prior to opening the batch valve 80 and discharging to the filter system and subsequently out of the system. A batch is sufficiently reared by visual inspection or analytical test. Once a waste stream of known quality is treated, subsequent batches may be processed from experience or historical results.

It will of course be understood that in the batch mode of operation, a predetermined volume of water is introduced into the first treatment tank 22 (up to about 1000 gallons, for a system having a first tank capacity of this amount). The water is then circulated for a predetermined length of time through the first treatment tank 22 and the coalescer channel 41, with the batch valve 80 is set at a closed position to prevent removal of the water. After the water has been recirculated through the first treatment tank 22 and the coalescer channel 41 for a predetermined length of time, the batch valve 80 is then set to an open position operative to allow the water to exit the coalescer channel 41 and be discharged into the second treatment tank 103, instead of being discharged into the coalescer recirculation channel 73 of the first treatment tank 22.

In the disclosed embodiment, the batch valve 80 and batch/continuous mode processing valve 29 are manually operated. Alternatively, the control of these valves could be automated.

It is to be understood that all other aspects of the batch mode of operation are the same as those described above for the continuous mode of operation, particularly, the introduction of microorganisms and catalyst.

FIGS. 6A–6I demonstrate the passage of the water through the embodiment illustrated in FIG. 1 while the apparatus is operated in the batch mode of operation.

Figure 6A:
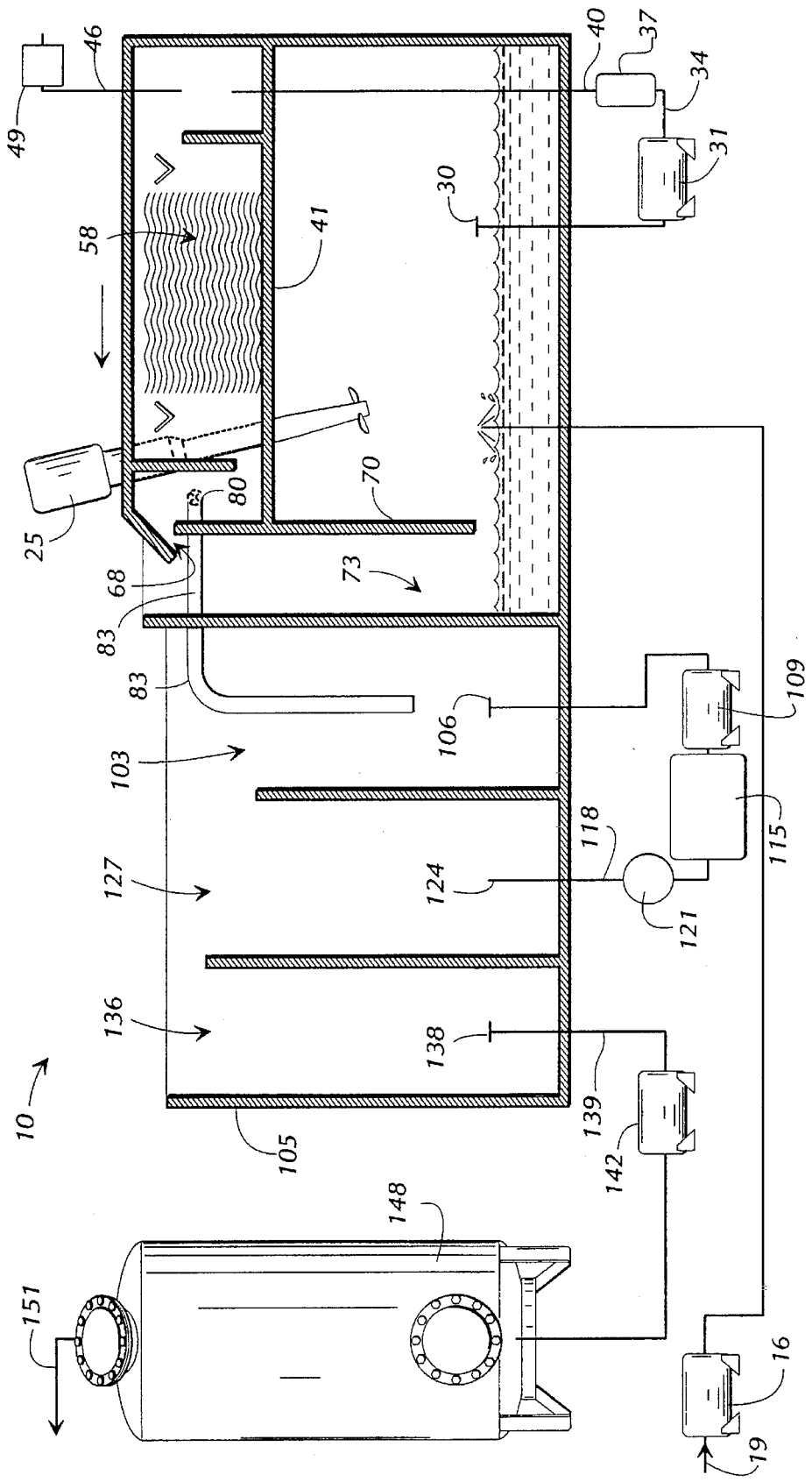

Referring now to FIG. 6A, it will be observed that contaminated water is being pumped into the first treatment tank 22 by the first pump 16. The contaminated water will accumulate in first treatment tank 22 until the level of the water reaches the second pump intake 30. It will be recalled that the second pump intake 30 is positioned at about 4 inches from the floor of the tank 22, as compared to 6 inches for the first pump intake, which is not utilized in batch mode operation.

Figure 6B:
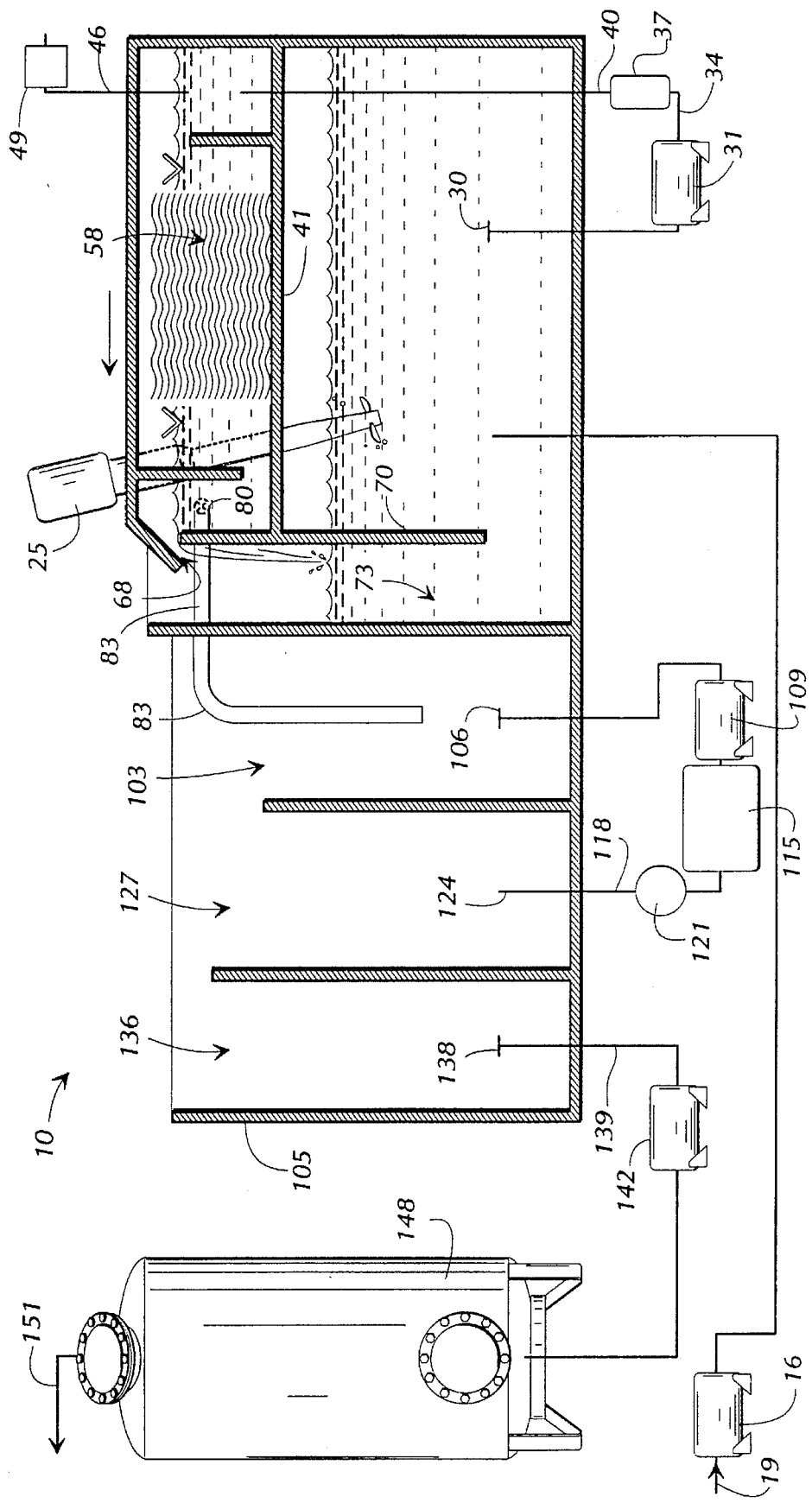

Referring now to FIG. 6B, it will be observed that the contaminated water has accumulated in the first treatment tank 22 to a level above the second pump intake 30. At this stage, some of the contaminated water will enter the second pump intake 30 and be pumped by the second pump 31 through the fluid heater 37 into the coalescer channel 41.

As in the continuous mode operation, microorganisms and catalyst are introduced at the microorganism introduction region 43. The water next flows through the coalescer 58. Once the water level within the coalescer channel 41 reaches the level of the coalescer channel outlet 68, the water flows by gravity through the coalescer channel outlet into the first treatment tank reentry region 73. The water then passes under weir 70 is reaerated by aerator 25.

Figure 6C:
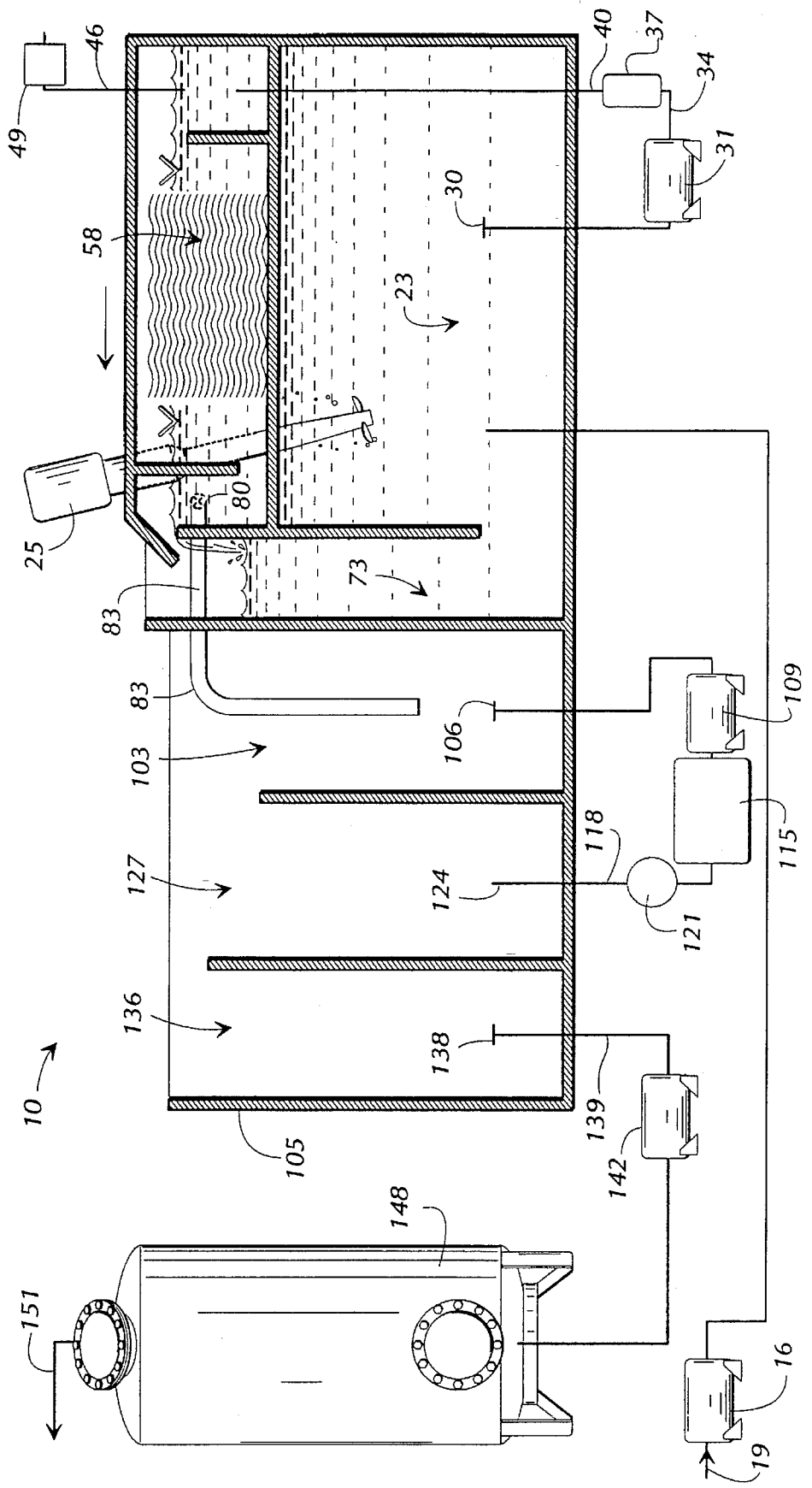

In FIG. 6C, the first treatment tank 22 is filled to capacity with contaminated water. Therefore, no further contaminated water is introduced, and the batch for treatment is now contained in the first treatment tank 22. The water in the first treatment tank 22 is continually recirculated through the coalester 58 and through aeration region 23 by the second pump 31. This continual recirculation of the water continues until batch valve 80 is set to the open position to remove the water. It will be understood that batch valve 80 has been set in the closed position in FIGS. 6A–6C. The recirculation should continue until a determination, empirical or otherwise, that the oil has been removed from the waste by action of the microorganisms and skimmers sufficiently to warrant removal from the first tank, filtration, and discharge.

Figure 6D:
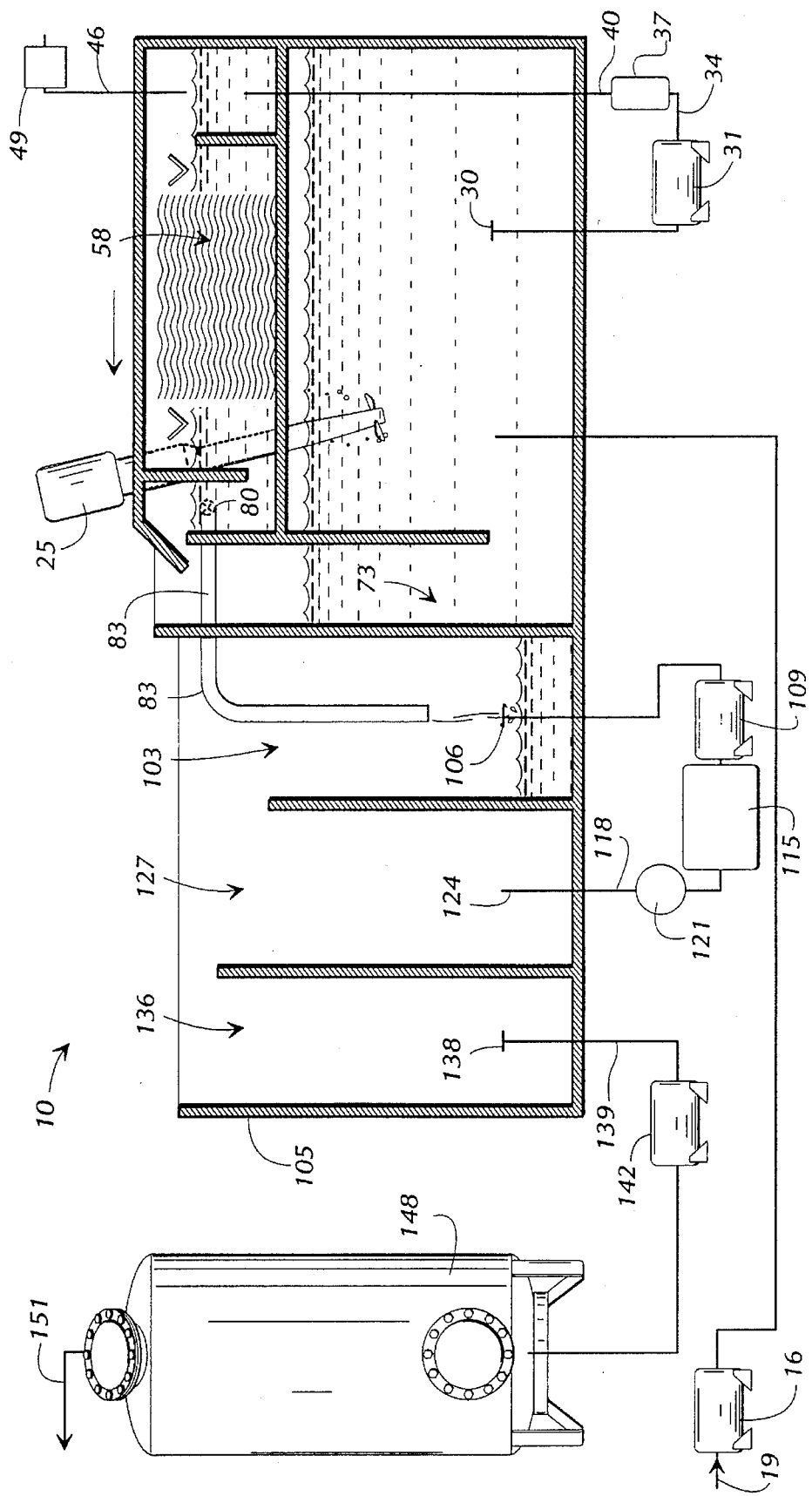

Referring now to FIG. 6D, it will be observed that batch valve 80 has been set to the open position. The water now is removed from the coalester channel 41 through the batch effluent pipe 83 by gravity, and it is discharged into the second treatment tank 103. The water then accumulates in the second treatment tank 103 until the water reaches the level of third pump intake 106.

Figure 6E:
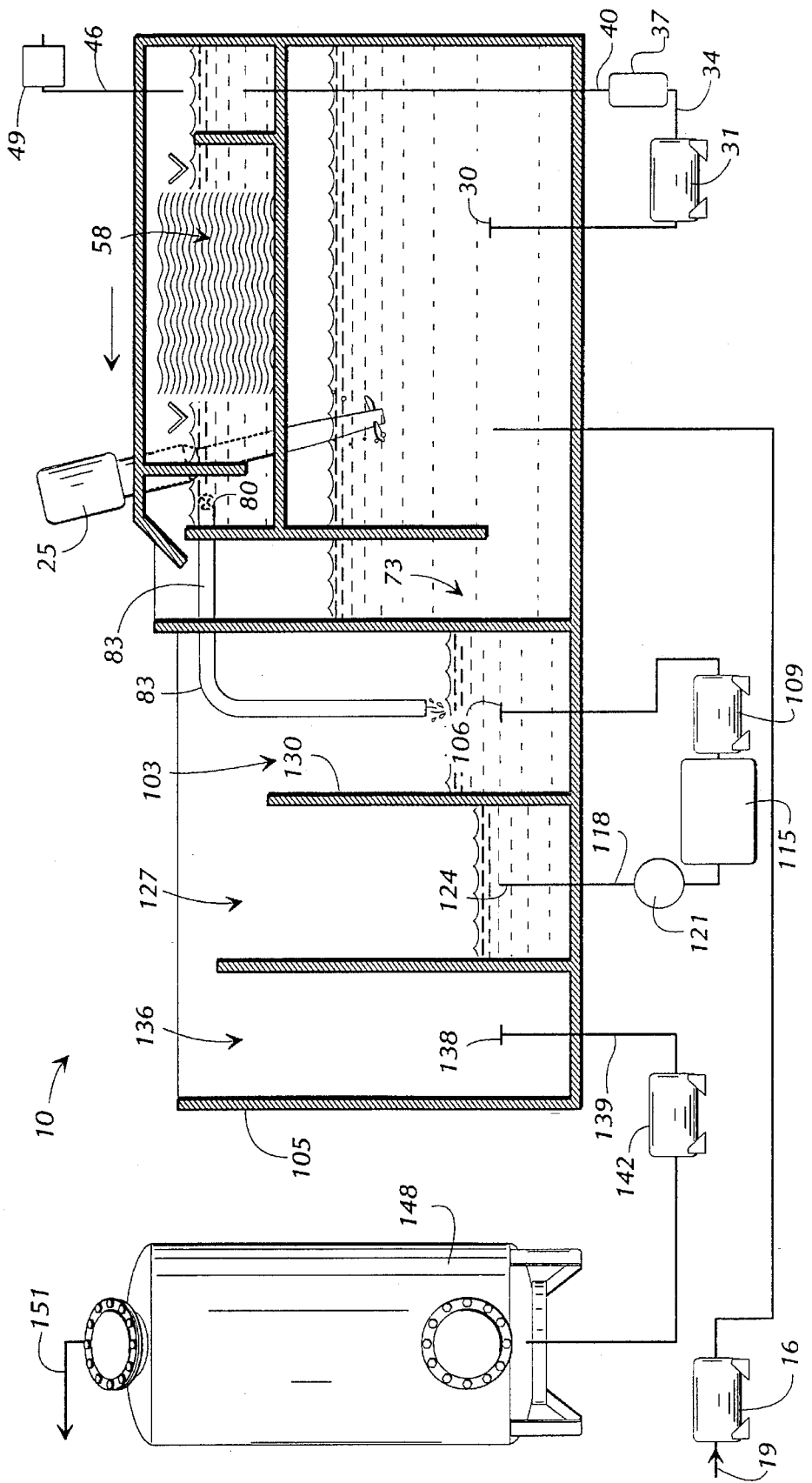

Referring now to FIG. 6E, it will be observed that the water in second treatment tank 103 has exceeded the level of the third pump intake 106. At this stage, filtration can begin. The water is then withdrawn from the second treatment tank 103 through the third pump intake 106 by third pump 109. The water is then pumped through the first filter 115, through the analytical detection device 121, and then discharged into the third treatment tank 127. The water accumulates in the third treatment tank 127 until the water reaches the top of the first barrier 130.

Figure 6F:
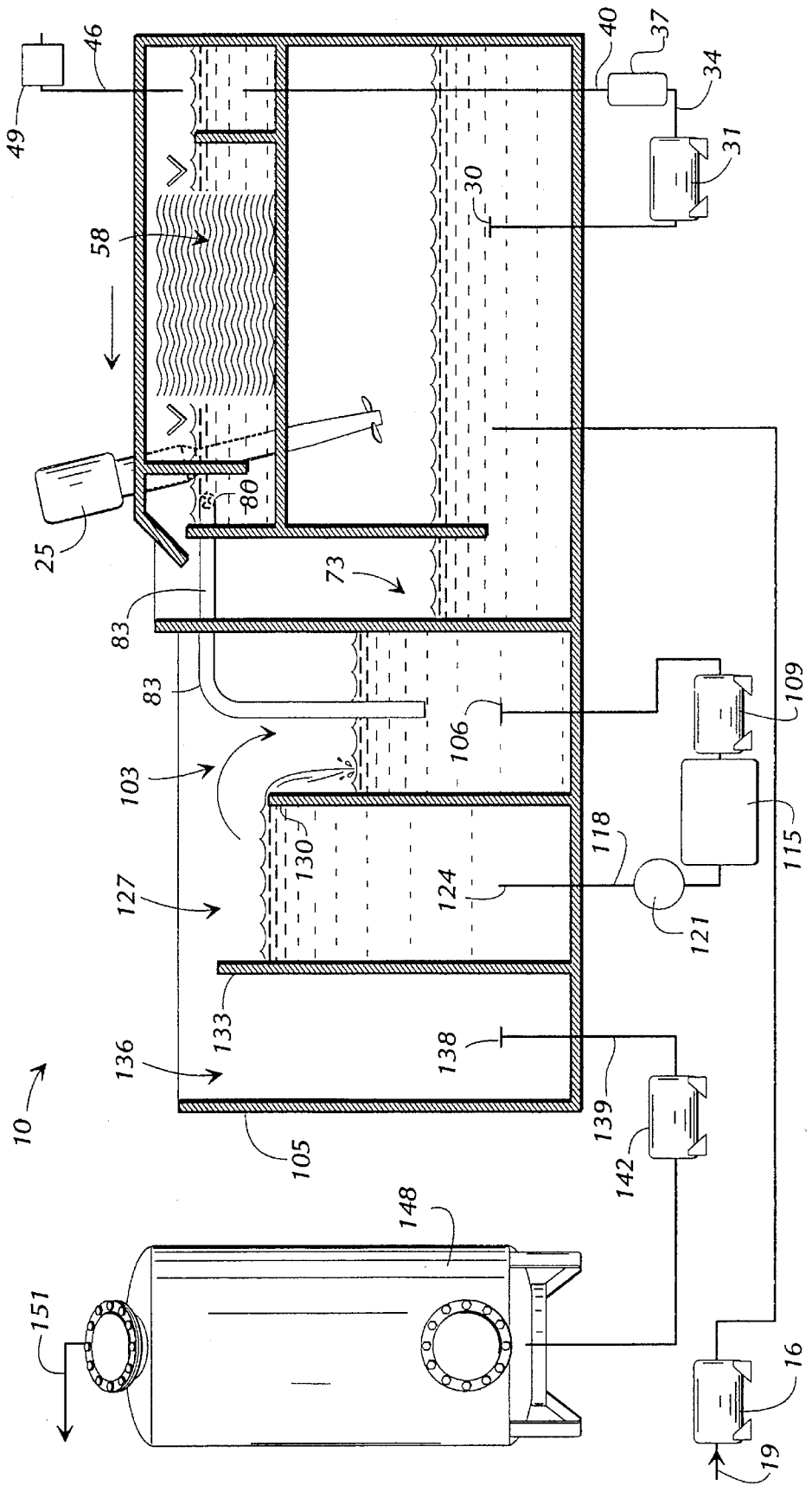

In FIG. 6F, the water in the third treatment tank 127 has reached the top of first barrier 130. The water then passes by gravity over the first barrier 130 back into the second treatment tank 103. The water in the second treatment tank 103 is then recirculated by the third pump 109 through the first filter 115 and is then discharged back into third treatment tank 127. The water is continually recirculated through the first filter 115 until the water in both the third treatment tank 127 and the second treatment tank 103 reaches the level of the top of the second barrier 133.

Figure 6G:
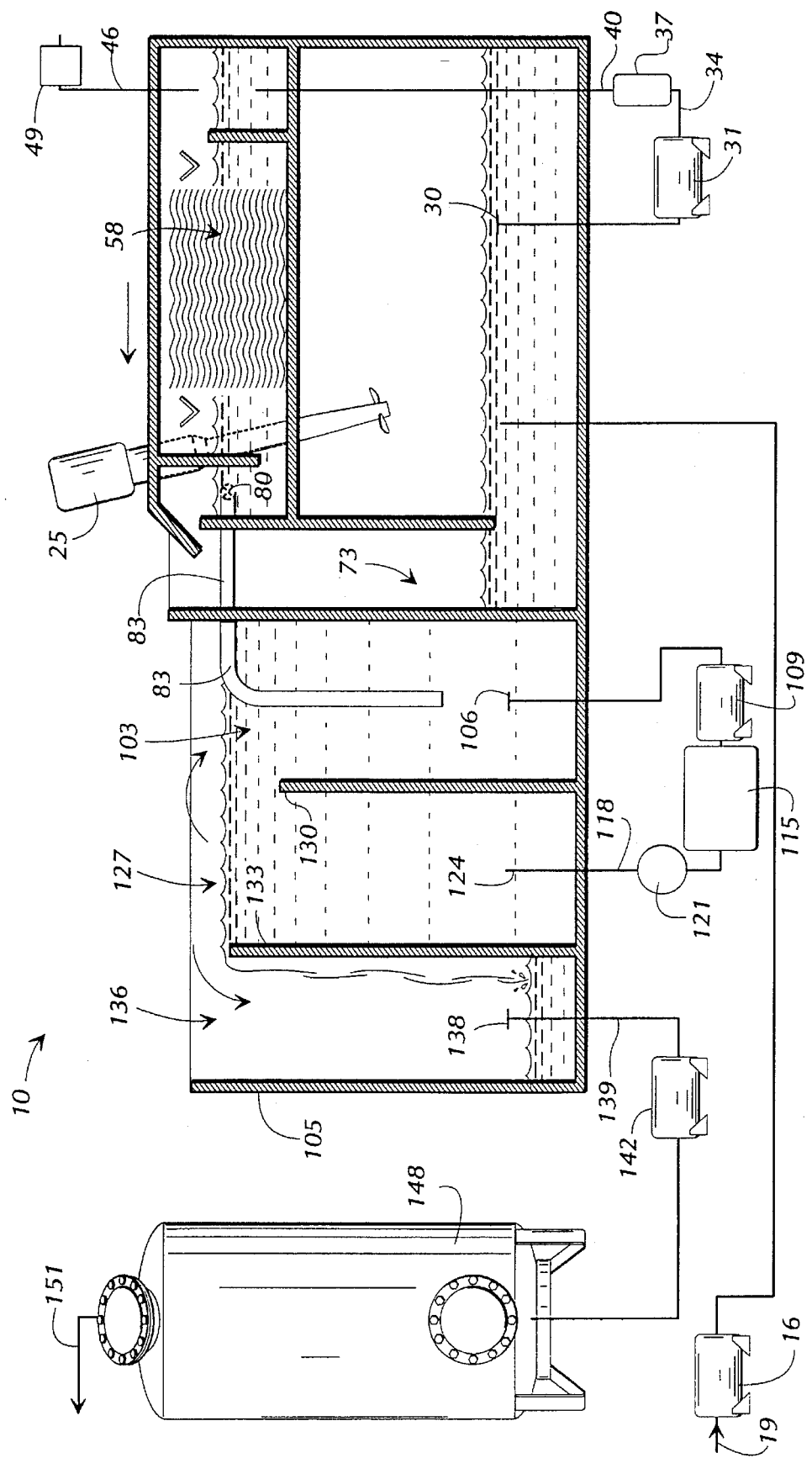

Referring now to FIG. 6G, it will be observed that the water in third treatment tank 127 and second treatment tank 103 has exceeded the level of the top of the second barrier 133. Note also that the level of water in the first treatment tank 22 is substantially lowered, inasmuch as most of the batch of water has been treated and passed on to subsequent treatment stages. The water passes by gravity into the fourth treatment tank 136 where it accumulates until it reaches the level of fourth outlet 138.

Figure 6H:
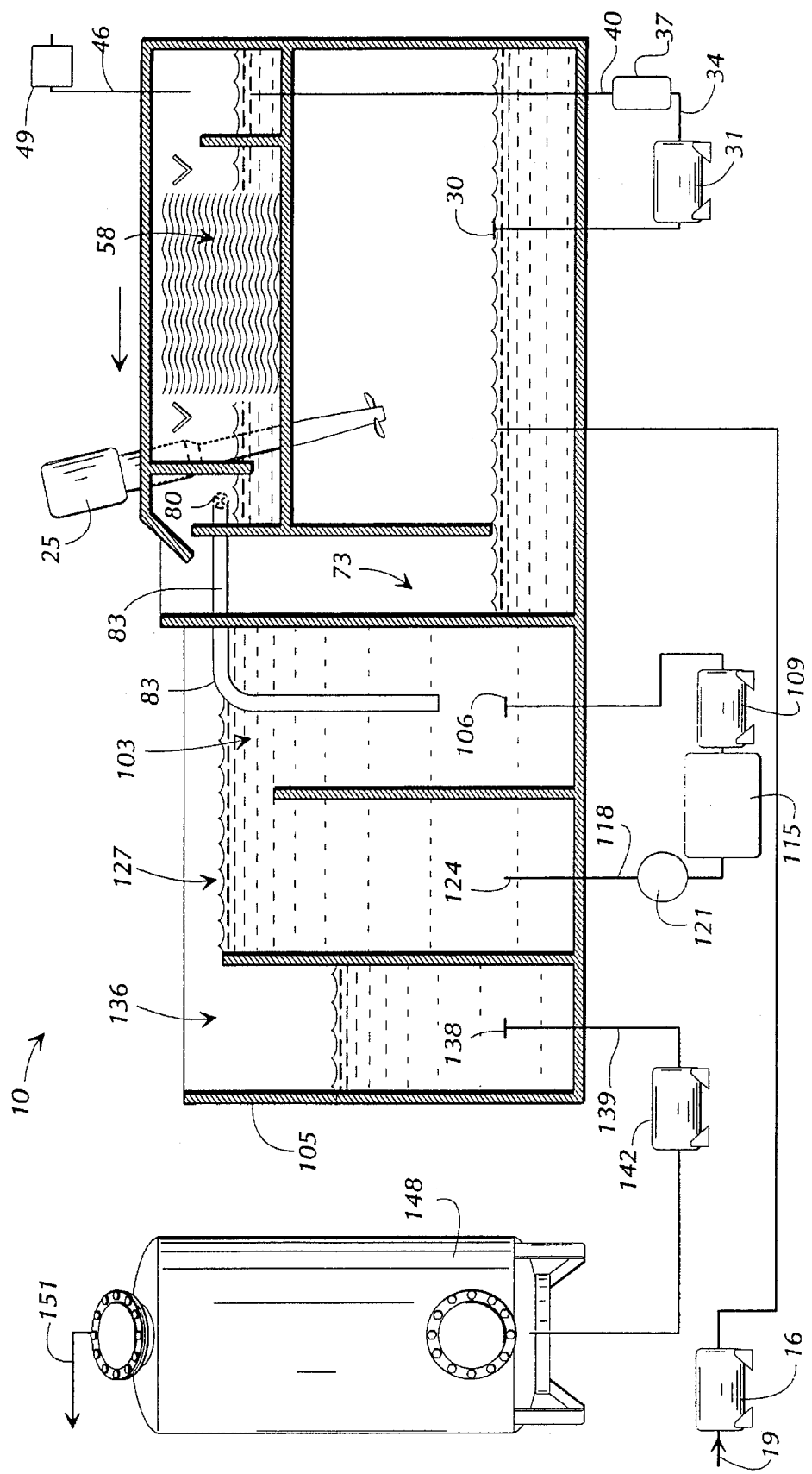
Figure 61:
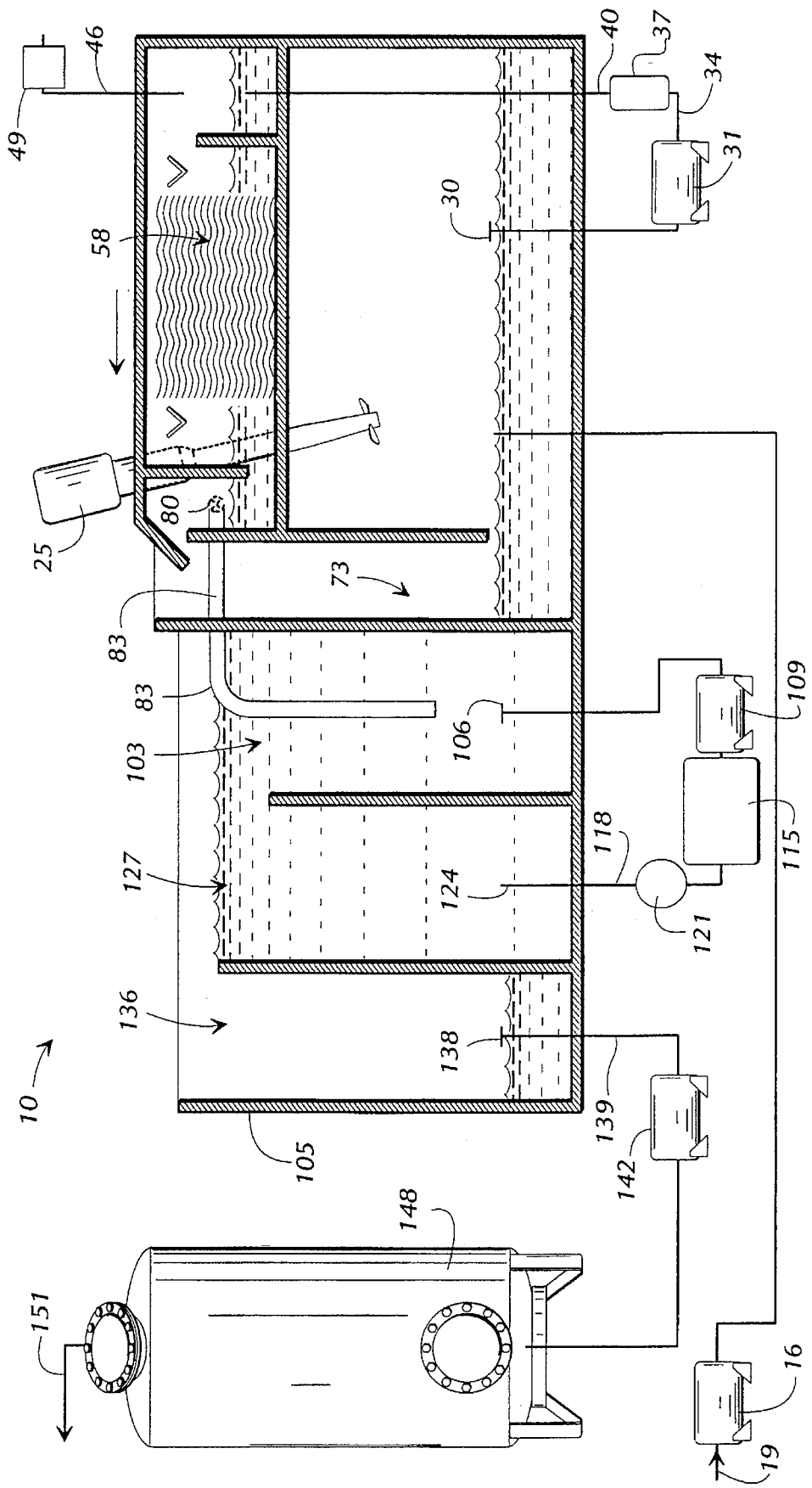

Referring now to FIG. 6H, it will observed that the water in the fourth treatment tank 136 has exceeded the level of fourth outlet 138. The water is then withdrawn from fourth treatment tank 136 by the fourth pump 142, and is pumped through the second filter 148. Finally the clean water is discharged from apparatus 10 via pipe 151.

In order to drain the system, external drain lines (not shown) connected by manual shut off valves (not shown) are provided in the preferred embodiment. Such valves connect tank 127 to tank 136 at their bottom drain position, thereby allowing the fourth pump 142 to exhaust the system with exception of small quantity left below the level of the pump inlets/outlets in tanks 103, 127, 136.

From the foregoing, it will be understood that the present invention provides numerous advantages in performance over prior art systems, including prior art systems such as the Biotek system that utilize oil consuming microorganisms in conjunction with a general coalescer. First, the present invention is operative in both batch and continuous modes, whereas the prior art Biotek apparatus was batch only. Second, the present invention preferably includes one or more large quiescent zones in the system, where the emulsification is minimized. Such large zones, which are not present in the prior art Biotek system, are believed to enhance the work of the microorganisms and promote breaking emulsions. Third, the present invention provides for partial removal of cleaned fluid directly from the coalescer via an overflow path. No such structure is provided in the Biotek system. Fourth, flow rates are more controllable in the present invention, so that laminar flow through the coalescer can be maintained to optimize coalescing. Fifth, the present invention provides for recirculation of the cleaned fluid at various stages, including the first, bioremediating stage and subsequent, filtration stages. No such all inclusive recirculation is provided in the Biotek system. Sixth, the present invention provides means for heating the system to enhance the growth and survival of the microorganisms; such means are not present in the Biotek system. Seventh, the preferred embodiment of the invention is fabricated from sheet metal welded to a sturdy metal frame, in a self-contained unit, which is robust and portable. The Biotek system is not meant for heavy industrial application, being at least partially fabricated with a closed plastic bioreactor which is difficult if not impossible to open and clean. Eighth, the present invention provides subsequent treatment stages to bioremediation in the same unit, with carbon and other types of filters, so that the effluent is cleaned to the greatest extent possible before release. The Biotek system did not contain any treatment stages subsequent to the bioreactor, and thus was not suitable for general industrial application.

The preferred embodiment of the present invention has been disclosed by way of example and it will be understood that other modifications may occur to those skilled in the art without departing from the scope and the spirit of the appended claims.

What is claimed is:

1. An apparatus for separating highly emulsified and/or immiscible components mixed in a fluid, which comprises:
    (a) a first treatment tank;
    (b) a coalescer channel mounted above said first treatment tank and operative for passing fluid in a substantially horizontal flow path, said coalescer channel comprising an inlet, a coalescer, and an outlet positioned to discharge fluid back into said first treatment tank; and
    (c) means for transferring fluid from said treatment tank to said coalescer channel.

2. The apparatus of claim 1, further comprising at least one skimmer in said coalescer channel for removing substances on the surface of the fluid.

3. The apparatus of claim 1, wherein said coalescer comprises a material selected from the group consisting of polypropylene, polynylon, polyester, polyvinyl chloride, polyvinylidene chloride, polytetrafluoroethylene, polyacrylic, polyurethane, and metal.

4. The apparatus of claim 1, wherein said coalescer comprises a plurality of spaced apart corrugated plates.

5. The apparatus of claim 4, wherein said coalescer comprises a stacked plurality of spaced apart polypropylene plates, each plate having corrugations along said plate forming crests and valleys, said plate having bleed holes for passage of the immiscible components upwardly to higher plates in the stack.

6. The apparatus of claim 4, wherein said polypropylene plates are arranged horizontally.

7. The apparatus of claim 1, further comprising an aerator located in said first treatment tank and operated in a manner conducive to the growth of oil metabolizing microorganisms.

8. The apparatus of claim 1, further comprising a heater for maintaining the fluid at a temperature conducive to the growth of oil metabolizing microorganisms.

9. The apparatus of claim 8, wherein the heater is operated to maintain the temperature of the fluid is between approximately 40° F. and 100° F.

10. The apparatus of claim 1, wherein said coalescer channel further comprises a dam located between said coalescer inlet and said coalescer, wherein said dam has an end positioned spaced apart from the top of said coalescer channel so as to allow fluid to flow over said dam.

11. The apparatus of claim 10, wherein said dam is a first dam, and wherein said coalescer channel further comprises a second dam located between said coalescer and said coalescer outlet, wherein said second dam has an end positioned spaced apart from the bottom of said coalescer channel so as to allow fluid to flow under said second dam such that lower weight components located in the higher levels of fluid in said coalescer channel are blocked by said second dam.

12. The apparatus of claim 1, wherein said fluid transferring means is a pump.

13. The apparatus of claim 12, further comprising a fluid inlet in said first treatment tank for introducing uncleaned fluid into said first treatment tank, and a pump intake in said first treatment tank connected to said pump.

14. The apparatus of claim 13, wherein said pump intake is positioned at an end of said first treatment tank opposite to said fluid inlet, and wherein said pump intake is positioned at a depth in said first treatment tank substantially higher than said fluid inlet, whereby said pump intake withdraws relatively cleaner fluid from said first treatment tank.

15. The apparatus of claim 1, further comprising a weir positioned in said first treatment tank proximate to said coalescer channel outlet, having a bottom end spaced apart from the bottom of said first treatment tank so as to allow fluid to flow under said weir, whereby fluid discharged from said coalescer channel into a region of said first treatment tank between said treatment tank and said weir, flows under said weir.

16. The apparatus of claim 1, further comprising a second treatment tank positioned to receive relatively cleaned fluid discharged from said first treatment tank.

17. The apparatus of claim 16, further comprising a first treatment tank outlet located at a level of said first treatment tank below the discharge level of said coalescer channel, such that when the fluid level reaches the level of said first treatment tank outlet, partially cleaned fluid discharges from said first treatment tank through said outlet by gravity into said second treatment tank.

18. The apparatus of claim 16, wherein said second treatment tank is positioned to receive relatively clean fluid discharged from said first treatment tank when said apparatus is operated in a continuous mode or from coalescer channel when said apparatus is operated in a batch mode, and to accumulate such fluid.

19. The apparatus of claim 16, further comprising a third treatment tank positioned to receive relatively clean fluid discharged from said second treatment tank, and to accumulate such fluid.

20. The apparatus of claim 19, further comprising a pump for transferring fluid from said second treatment tank to said third treatment tank.

21. The apparatus of claim 20, further comprising a pump intake for said pump positioned at a lower region of said second treatment tank for withdrawing fluid from said lower region of said second treatment tank.

22. The apparatus of claim 20, further comprising a filter positioned subsequent to said second treatment tank and prior to said third treatment tank, for filtering the fluid prior to discharging the fluid into said third treatment tank.

23. The apparatus of claim 22, wherein said third treatment tank is positioned in the path of flow subsequent to the path of flow from said second treatment tank such that when the level of fluid in said third tank rises to the level of the top of a barrier located between said third treatment tank and said second treatment tank, the fluid passes over said barrier and returns to said second treatment tank for recirculation.

24. The apparatus of claim 22, further comprising a fourth treatment tank positioned to receive relatively clean fluid discharged from said third treatment tank.

25. The apparatus of claim 24, further comprising a first barrier between said third treatment tank and said second treatment tank, and a second barrier located between said third treatment tank and said fourth treatment tank, said second barrier higher than said first barrier such that when the fluid level of said third tank reaches said second barrier, the relatively clean fluid passes over said second barrier and enters said fourth treatment tank.

26. The apparatus of claim 25, further comprising a fourth outlet located at the lower region of the fourth treatment tank for removing the relatively clean fluid from said lower region of said fourth treatment tank and then discharging the cleaned fluid from said apparatus.

27. The apparatus of claim 26, wherein said pump for transferring fluid from said second treatment tank to said third treatment tank is a first pump, and further comprising a second pump subsequent to said fourth treatment tank outlet for removing the relatively clean fluid from said lower region of said fourth treatment tank and then discharging the cleaned fluid from said apparatus.

28. The apparatus of claim 24, wherein said filter positioned subsequent to said second treatment tank and prior to said third treatment tank is a first filter, and further comprising a second filter positioned subsequent to said fourth treatment tank, for filtering the fluid prior to discharge.

29. The apparatus of claim 1, further comprising:

a first pump intake in said first treatment tank connected to said fluid transferring means positioned at a relatively high level in said first treatment tank;

a second pump intake in said first treatment tank connected to said fluid transferring means positioned at a relatively low level in said first treatment tank, a valve for selectably connecting said first pump intake or said second pump intake to said fluid transfer means.

30. The apparatus of claim 29, wherein said apparatus is operative in a continuous flow mode such that fluid is drawn into said first pump intake and directed to said coalescer channel.

31. The apparatus of claim 29, wherein said apparatus is operative in a batch flow mode such that fluid is drawn into said second pump intake to drain said first treatment tank, and is directed to said coalescer channel.

32. The apparatus of claim 1 said coalescer channel further comprising a valved outlet located below said coalescer channel outlet so as to discharge fluid by gravity through said valved outlet from said coalescer channel into a second treatment tank when said valve is in the open position.

33. The apparatus of claim 1, wherein said coalescer channel is operative to discharge fluid through its outlet by gravity into said first treatment tank.

34. An apparatus for separating immiscible components mixed in a fluid, comprising:

(a) a first treatment tank for containing a quantity of fluid to be cleaned and suitable for growing oil metabolizing microorganisms;

(b) a coalescer positioned above said first treatment tank and operative to receive fluid from said first treatment tank and to discharge fluid after coalescing back into said first treatment tank;

(c) a second treatment tank positioned to receive and accumulate relatively clean fluid discharged from said first treatment tank;

(d) a third treatment tank positioned to receive and accumulate relatively clean fluid discharged from said second treatment tank;

(e) a first filter positioned between said second treatment tank and said third treatment tank for filtering the fluid prior to discharging the fluid into said third treatment tank;

(f) a fourth treatment tank positioned to receive and accumulate relatively cleaned fluid from said third treatment tank; and (g) a second filter for filtering the fluid prior to discharging the fluid from said fourth treatment tank.

35. The apparatus of claim 34, further comprising an aerator operated in a manner conducive to the growth of oil metabolizing microorganisms.

36. The apparatus of claim 34, wherein said first treatment tank comprises an inlet located in a lower region of said treatment tank for introducing relatively uncleaned fluid, a weir having an end positioned spaced apart from the bottom of said first treatment tank so as to allow fluid to flow under said weir, and a first treatment tank outlet located in the upper region of said treatment tank for withdrawing relatively cleaned fluid.

37. The apparatus of claim 36, wherein said coalescer channel is operative to discharge into a region of said first treatment tank between said first treatment tank outlet and said weir.

38. The apparatus of claim 34, wherein said coalescer channel comprises an inlet, a coalescer, a dam, and an outlet, said coalescer positioned between said inlet and said outlet, said dam positioned between said coalescer and said outlet, said dam having an end positioned spaced apart from the bottom of said coalescer channel so as to allow fluid to flow under said dam such that lower weight components located in higher levels of the fluid in the coalescer channel are blocked by said dam.

39. The apparatus of claim 34, further comprising a first pump located prior to said first treatment tank for introducing fluid to be cleaned, said first pump operated at a rate conducive to the growth of oil metabolizing microorganisms.

40. The apparatus of claim 39, further comprising a second pump for transferring fluid from said first treatment tank to said coalescer channel, said second pump being operated at a rate conducive to the growth of oil metabolizing microorganisms.

41. The apparatus of claim 40, further comprising a third pump for transferring fluid from said second treatment tank to said third treatment tank.

42. The apparatus of claim 41, further comprising a fourth pump for withdrawing fluid from said fourth treatment tank and discharging cleaned fluid.

43. The apparatus of claim 34, further comprising a first barrier located between said second treatment tank and said third treatment tank, such that when the level of fluid in said third treatment tank rises to the level of the top of said first barrier, fluid passes over said first barrier into said second treatment tank for recirculation through said first filter.

44. The apparatus of claim 43, further comprising a second barrier located between said third treatment tank and said fourth treatment tank, wherein said second barrier is higher than said first barrier, and such that when the fluid level of said third treatment tank exceeds the level of the top of said second barrier, the relatively clean fluid passes over said second barrier and enters said fourth treatment tank.

45. The apparatus of claim 34, further comprising a heater for maintaining the fluid at a temperature conducive to the growth of oil metabolizing microorganisms.

46. The apparatus of claim 45, wherein the temperature of said fluid is between approximately 40° F. and 100° F.

47. The apparatus of claim 38, wherein said dam positioned between said coalescer and said outlet is a first dam, and further comprising a second dam located between said coalescer and said outlet, said second dam having an end positioned spaced apart from the top of said coalescer channel so as to allow fluid to flow over said dam.

48. The apparatus of claim 34, further comprising at least one skimmer located perpendicular to the direction of flow of fluid, towards the uppermost region of said coalester channel for skimming off the lower weight components of the fluid from the top of the fluid within said coalester channel.

49. The apparatus of claim 48, wherein said skimmer is located proximate to said coalescer.

50. The apparatus of claim 47, further comprising a first skimmer and a second skimmer located perpendicular to the directional flow of fluid, towards the uppermost region of said coalescer channel for skimming off the lower weight components of the fluid from the top of the fluid within said coalescer channel, said first skimmer being located between said first dam and said coalescer, and said second skimmer being located between said second dam and said coalescer.

51. The apparatus of claim 2, wherein said skimmer is located proximate to said coalescer, located perpendicular to the directional flow of fluid, towards the uppermost region of said coalescer channel for skimming off the lower weight components of the fluid from the top of the fluid within said coalescer channel.

52. The apparatus of claim 11, wherein said coalescer channel contains a first skimmer and a second skimmer, each skimmer located perpendicular to the directional flow of fluid, towards the uppermost region of said coalescer channel for skimming off the lower weight components of the fluid from the top of the fluid within said coalescer channel, wherein said first skimmer is located between said first dam and said coalescer, and wherein said skimmer is located between said second dam and said coalescer.

* * * * *